United States Patent
Srivastava et al.

(10) Patent No.: US 10,925,014 B2
(45) Date of Patent: Feb. 16, 2021

(54) METHOD AND APPARATUS FOR SYNCHRONIZATION IN A NETWORK

(71) Applicant: Samsung Electronics Co., Ltd., Suwon-si (KR)

(72) Inventors: Hemanshu Srivastava, Noida (IN); Avinash Singh, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 15/206,823

(22) Filed: Jul. 11, 2016

(65) Prior Publication Data

US 2017/0019870 A1 Jan. 19, 2017

(30) Foreign Application Priority Data

Jul. 16, 2015 (IN) .......................... 2164/DEL/2015

(51) Int. Cl.
*H04W 56/00* (2009.01)
*H04L 29/08* (2006.01)

(52) U.S. Cl.
CPC ....... *H04W 56/001* (2013.01); *H04L 67/1095* (2013.01)

(58) Field of Classification Search
CPC .................. H04W 56/001; H04L 67/1095
See application file for complete search history.

(56) References Cited

U.S. PATENT DOCUMENTS

| | | | |
|---|---|---|---|
| 7,333,725 B1 | 2/2008 | Frazier | |
| 8,284,310 B2 | 10/2012 | Mallinson | |
| 8,505,054 B1 * | 8/2013 | Kirley | H04N 21/436 725/74 |
| 8,649,659 B2 | 2/2014 | Lalwaney | |
| 2004/0008661 A1 | 1/2004 | Myles et al. | |
| 2005/0251827 A1 * | 11/2005 | Ellis | H04N 5/44543 725/47 |
| 2008/0077261 A1 * | 3/2008 | Baudino | H04H 20/63 700/94 |
| 2012/0165100 A1 * | 6/2012 | Lalancette | A63F 13/10 463/42 |
| 2012/0324324 A1 | 12/2012 | Hwang et al. | |
| 2013/0041747 A1 | 2/2013 | Anderson et al. | |
| 2013/0173742 A1 * | 7/2013 | Thomas | H04L 65/4076 709/217 |
| 2013/0173808 A1 | 7/2013 | Yoon et al. | |

(Continued)

OTHER PUBLICATIONS

Indian Search Report dated Dec. 17, 2018, issued in a counterpart Indian application No. 2164/DEL/2015.

*Primary Examiner* — Alex Skripnikov
*Assistant Examiner* — Sharmin Chowdhury
(74) *Attorney, Agent, or Firm* — Jefferson IP Law, LLP

(57) ABSTRACT

The present disclosure provides method and apparatus for causing synchronization of at least one connected device by a source device, where the apparatus is adapted to perform the method comprising: receiving, by a receiver, delay information corresponding to at least one device which is connected to the source device and configured to process at least one type of data; calculating, by a processor, at least one delay value of the at least one device based on the delay information; and synchronizing the at least one device with the source device based on the at least one calculated delay value.

20 Claims, 24 Drawing Sheets

(56) References Cited

U.S. PATENT DOCUMENTS

| | | | |
|---|---|---|---|
| 2013/0223539 A1* | 8/2013 | Lee | H04N 21/4122 375/240.25 |
| 2014/0126407 A1* | 5/2014 | Zirwas | H04B 7/024 370/252 |
| 2015/0004918 A1* | 1/2015 | Wang | H04W 88/02 455/73 |
| 2015/0079910 A1* | 3/2015 | Tachikawa | H04W 24/08 455/67.11 |
| 2015/0120953 A1* | 4/2015 | Crowe | H04L 65/60 709/231 |
| 2016/0014790 A1* | 1/2016 | Takehana | H04W 72/085 370/329 |
| 2016/0212674 A1* | 7/2016 | Nakamura | H04W 36/30 |
| 2016/0302166 A1* | 10/2016 | Dang | H04W 56/001 |

\* cited by examiner

METHOD AND APPARATUS FOR SYNCHRONIZATION IN A NETWORK

CROSS-REFERENCE TO RELATED APPLICATION

This application claims priority from 2164/DEL/2015 filed on Jul. 16, 2015, in the Indian Patent Office, the disclosure of which is incorporated herein in its entirety by reference.

BACKGROUND OF THE INVENTION

1. Field of the Invention

The present disclosure relates to controlled operation of devices in a network, and in particular, synchronization of devices in a network.

2. Description of the Related Art

Broadband or High speed network communication through a wired local area network (LAN) is a renowned phenomenon. The later evolved wireless local area network (WLAN) and the recent evolution of network communication through "cloud computing" are equally adapted to support broadband network communication. The execution of high speed wireless networks enables networked devices to be dispersed throughout a room or a complex. Accordingly, high speed network communication enables multimedia-content distribution among networked devices that are spaced apart from each other. Examples of such scenarios include a television (TV) acting as a source device to play multimedia content and different wireless speakers receiving audio data from the TV.

Thus, it is an object of the present disclosure to provide a method and system for enabling a centralized mechanism which facilitates synchronization between devices in a network.

Another object of the present disclosure is to enable centralized synchronization among different types of devices connectable to the network.

SUMMARY

Accordingly, the present disclosure provides method of synchronizing at least one device with a source device, the method comprising: receiving, by a receiver, delay information corresponding to at least one device which is connected to the source device and configured to process at least one type of data; calculating, by a processor, at least one delay value of the at least one device based on the delay information; and synchronizing the at least one device with the source device based on the at least one calculated delay value.

The present disclosure also provides an apparatus for synchronizing at least one device with a source device, the apparatus comprising: a receiver configured to receive delay information corresponding to at least one device which is connected to the source device, the at least one device being configured to process at least one type of data; and a processor configured to calculate at least one delay value of the at least one device based on the delay information and synchronize the at least one device with the source device based on the at least one calculated delay value.

The present disclosure furthermore provides an apparatus for synchronizing at least one device with a source device, the apparatus comprising: a first receiver configured to receive at least one type of data to be transmitted to at least one device which is connected to the source device and configured to process the at least one type of data; a second receiver configured to receive delay information related to the at least one device; and a processor configured to calculate at least one delay value of the at least one device based on the delay information and synchronize the at least one device with the source device based on the at least one calculated delay value.

To further clarify advantages and features of the present disclosure, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings.

Figure 1:
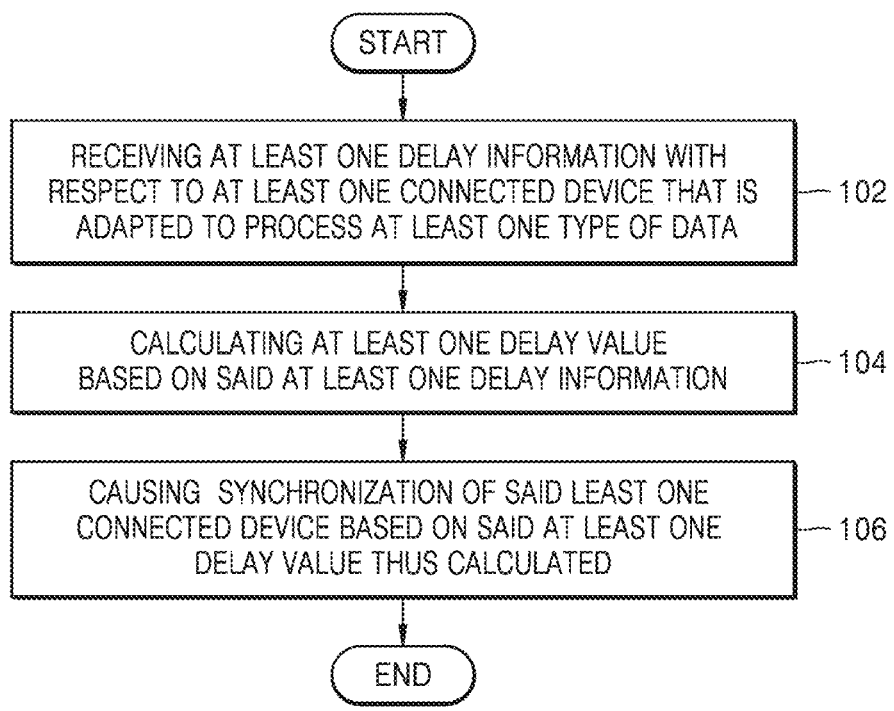
FIG. 1 illustrates a flow chart corresponding to a first example embodiment of the invention.

Further, skilled artisans will appreciate that elements in the drawings are illustrated for simplicity and are not necessarily drawn to scale. For example, the flow charts of present disclosure are for aiding in understanding aspects of the present disclosure and are not limited to the steps illustrated therein. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the present disclosure, reference will now be made to the exemplary embodiments illustrated in the drawings and specific language will be used to describe the same. It will nevertheless be understood that no limitation of the scope of the invention is thereby intended, and alterations and further modifications to the illustrated system, along with further applications of the principles of the example embodiments of the present disclosure as illustrated therein would have been understood by one skilled in the art to which the disclosure relates.

It will be understood by those skilled in the art that the foregoing general description and the following detailed description are example and explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present disclosure will be described below in detail with reference to the accompanying drawings.

Cloud based multimedia devices such as in-room speakers, surround air track, mobile phones and TVs receive the multimedia content from one or more sources. A critical issue with digital content transmission and playback is uncertainty in the playback timing, especially for applications where audio and video devices are spaced apart and have different capabilities and processing ability. Very often in such a scenario, one faces a loss of synchronization during playback of audio/video content on different devices receiving data from one or more sources. In an example, the synchronization of audio/video content depends on the amount of time each device requires to decode video and audio, network delay and jitter, and clock speeds of each device. The synchronization problem arises very often in enclosed surroundings (e.g., office or house) where delay and packet loss vary depending on the location of each receiving device with respect to one or more Wi-Fi access points or due to interference in the network. Accordingly, time synchronization over a wireless LAN or a cloud network remains a growing challenge.

The currently available synchronization techniques require major upgrades at the receiver (i.e., receiving device) end within the network, in terms of hardware and configuration settings, so as to achieve synchronization. In other words, the currently known synchronization mechanism largely resides at the receiver end. In an example, audio-video synchronization mainly depends on audio-video time-stamping and synchronization at the receiver end. In the case of multi-speaker and multichannel systems, audio-video devices are required to be playback/render content in synchronization. As a result, the current network synchronization techniques involve substantial investment of time and expenditure, as the receiving devices in the network are generally huge in number.

Accordingly, there remains a long felt need towards achieving synchronization among devices in the network, without substantially having to upgrade or configure each device in the network.

Yet another need is to achieve network synchronization among different types of devices that are connectable to the network.

Now referring to FIG. 1, it may be seen that the present disclosure provides a method for causing synchronization of at least one connected device by a source device, comprising: receiving (step 102) at least one delay information with respect to at least one connected device that is adapted to process at least one type of data; calculating (step 104) at least one delay value based on the delay information; and causing (step 106) synchronization of said least one connected device based on said at least one delay value thus calculated. In an embodiment, wherein the delay is caused due to one or more of: capability of the at least one connected device; network propagation time period; and data processing time period.

In an embodiment, the delay information includes device capability related information; network propagation related information; and data processing related information; and network threshold.

In an embodiment, the device capability related information is used to calculate delay caused due to capability of the at least one connected device.

In an embodiment, the delay caused due to capability of the at least one connected device is determined statically or dynamically, based on the device capability related information of the connected device.

In an embodiment, the delay caused due to capability of the at least one connected device is determined based on at least one of: a capability information specific to a configuration of the at least one device, in the event said source device operates under a mode of operation dependent on said connected device's configuration and a capability information corresponding to a technically inferior configuration than the at least one device, in the event said source device operates under a mode of operation independent of said connected device's configuration.

In an embodiment, the network propagation related information is used to calculate a network propagation time period, said network propagation time period comprising an amount of time for transmission of data and an amount of time for receiving acknowledgment of data in respect of the transmitted data.

In another embodiment, the network propagation time period is determined statically or dynamically based on the network propagation related information.

In yet another embodiment, the method further comprises correcting, prior to calculating at least one delay value based on the delay information, said network propagation time period based on a pre-determined criteria.

In yet another embodiment, the method further comprises: calculating a threshold parameter for the network propagation time period based on said network delay information and a pre-determined criteria.

In yet another embodiment, the threshold parameter is calculated based on variation in said network propagation time period during an elapsed pre-determined time period.

In yet another embodiment, the data processing related information is used to calculate data processing time period.

In yet another embodiment, the data processing time period is determined statically or dynamically, based on the data processing related information.

In yet another embodiment, the data processing time period is dependent upon a type of decoding technique for decoding of the data.

In yet another embodiment, the type of data is selected from one or more of: an audio data; a video data; and a display data.

In yet another embodiment, the synchronization of said least one connected device comprises at least one of transmitting the data in accordance with the delay value thus calculated; communicating a timing value specific to the at least one device; and communicating a timing value non-specific to the at least one device.

In yet another embodiment, the method further comprises at least one of: generating a timing value specific to the at least one device based on device specific delay value and a network time period; and generating a timing value non-specific to the at least one device based on a network time period.

In yet another embodiment, the connected device is either a computing device or at least one of an audio device, a video device, an audio-visual device, a communication device, and an electro-mechanical device, each having an embedded system.

In yet another embodiment, the connected device is operationally connected to at least the source device in a local area network.

Figure 2:
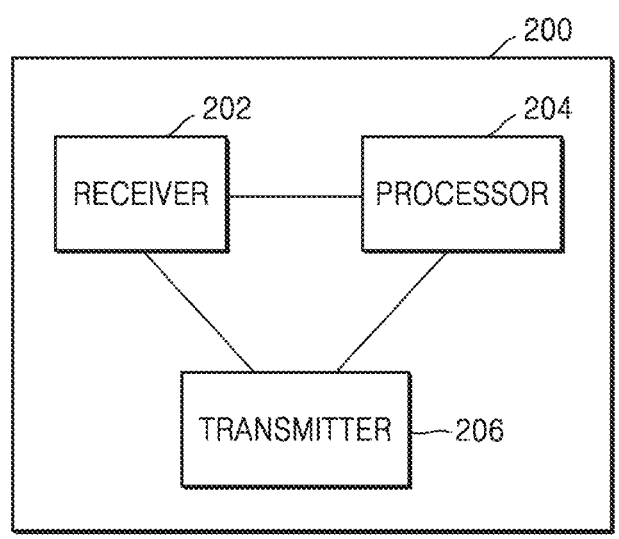
FIG. 2 illustrates an internal construction of the apparatus in accordance with first example embodiment of the present disclosure.

Referring to FIG. 2, the present disclosure also provides an apparatus 200 for causing synchronization of at least one connected device by a source device, the apparatus 200 comprising: a receiver 202 for receiving at least one delay information with respect to at least one connected device that is adapted to process at least one type of data; and a processor 204 for calculating at least one delay value based on the delay information; wherein the processor 204 in an operational interconnection with a transmitter 206 causes synchronization of the at least one connected device based on the at least one delay value thus calculated.

In one embodiment, the receiver 202 receives the delay information as at least one of: device capability related information; network propagation related information; data processing related information; and network threshold.

In one embodiment, the processor 204 uses the device capability related information to calculate delay caused due to capability of the at least one connected device.

In other embodiment, the processor 204 uses the network propagation related information to calculate a network propagation time period, said network propagation time period comprising an amount of time for transmission of data and an amount of time for receiving acknowledgment of data in respect of the transmitted data.

In another embodiment, the processor 204 corrects, prior to calculating at least one delay value based on the delay information, the network propagation time period based on a pre-determined criteria.

In another embodiment, the processor (204) calculates a threshold parameter for the network propagation time period based on the network delay information and a pre-determined criteria.

In another embodiment, the processor 204 calculates the threshold parameter based on variation in the network propagation time period during an elapsed pre-determined time period.

In another embodiment, the processor 204 uses the data processing related information to calculate data processing time period.

In another embodiment, the processor 204 causes synchronization of the at least one connected device by actuating a transmitter to perform at least one of: transmitting the data in accordance with the delay value thus calculated; communicating a timing value specific to the at least one device; and communicating a timing value non-specific to the at least one device.

In another embodiment, the processor 204 actuates a time-stamp generator to perform at least one of: generating a timing value specific to the at least one device based on device specific delay value and a network time period; and generating a timing value non-specific to the at least one device based on a network time period.

Figure 3:
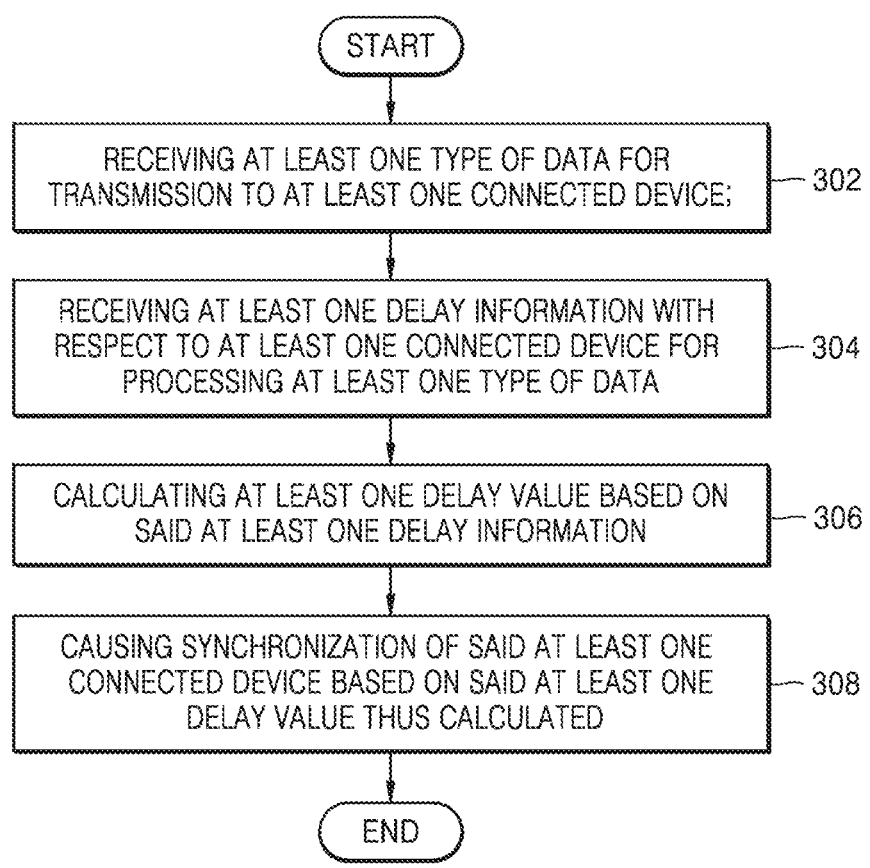
FIG. 3 illustrates a flow chart corresponding to a second example embodiment of the invention.

Now referring to FIG. 3, it may be seen that the present disclosure further provides a method for causing synchronization of at least one connected device by a source device, the method comprising: receiving (step 302) at least one type of data for transmission to at least one connected device; receiving (step 304) at least one delay information with respect to at least one connected device for processing at least one type of data; calculating (step 306) at least one delay value based on the delay information; and causing (step 308) synchronization of said least one connected device based on said at least one delay value thus calculated.

Figure 4:
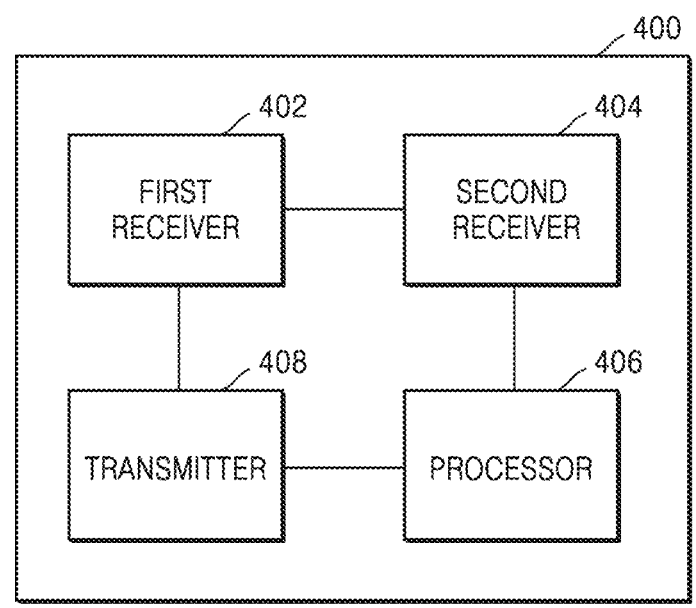
FIG. 4 illustrates an internal construction of the apparatus in accordance with a second example embodiment of the present disclosure.

Referring to FIG. 4, the present disclosure also describes an apparatus 400 for causing synchronization of at least one connected device by a source device, the apparatus 400 comprising: a first receiver 402 for receiving at least one type of data for transmission to at least one connected device; a second receiver 404 for receiving at least one delay information with respect to at least one connected device for processing at least one type of data; and a processor 406 for calculating at least one delay value based on the delay information; wherein the processor 406 in operational interconnection with a transmitter 408 causes synchronization of said least one connected device based on said at least one delay value thus calculated.

Figure 5:
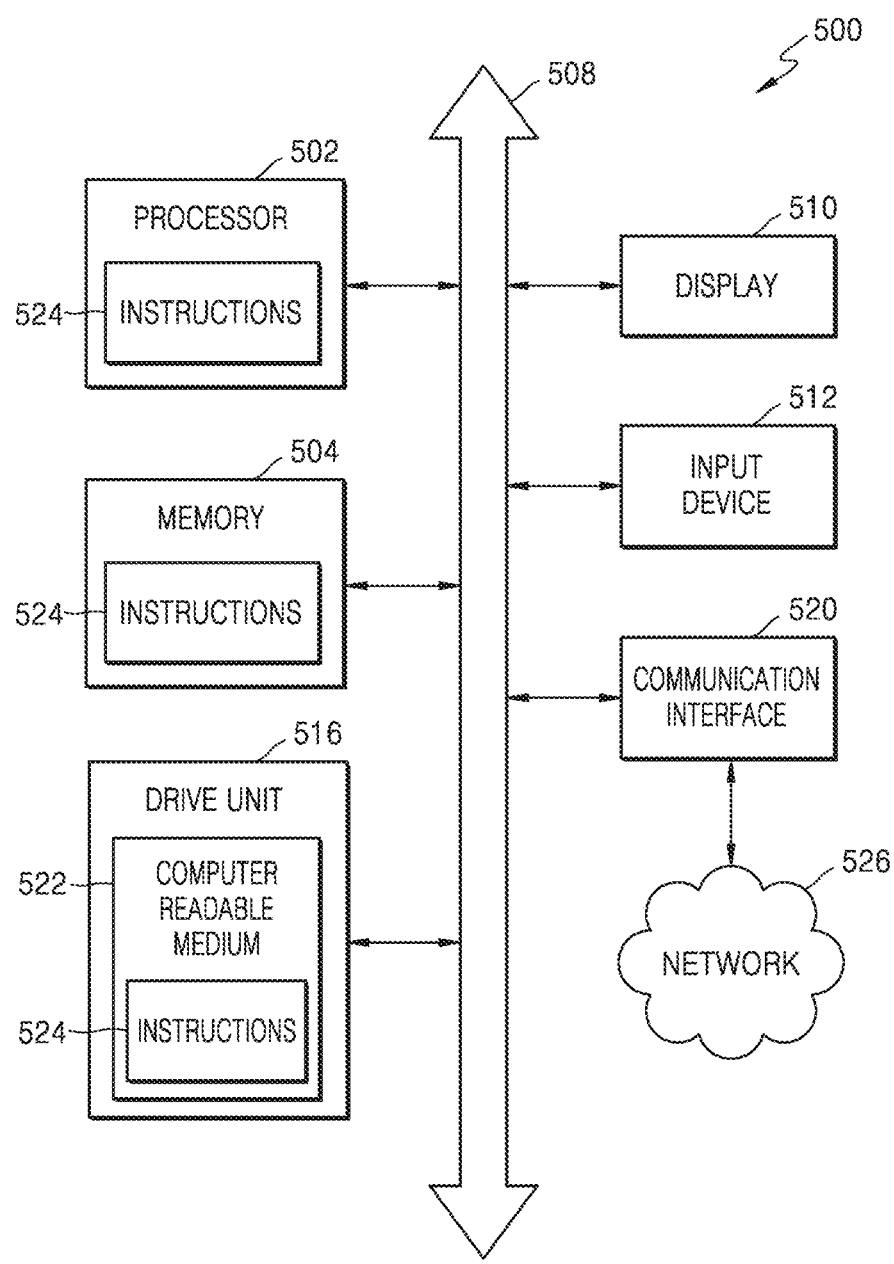
FIG. 5 illustrates an internal construction of the apparatus as described in FIG. 2 and FIG. 4.

Referring to FIG. 5, yet another typical hardware configuration of the apparatus 200 or apparatus 400 in the form of a computer system 500 is shown. The computer system 500 may include a set of instructions that when executed by the computer system 500 may perform any one or more of the methods disclosed. The computer system 500 may operate as a standalone device or may be connected, e.g., via a network, to other computer systems or peripheral devices.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 500 is illustrated, the term "system" shall also be taken to include any collection of systems or sub-systems that individually or jointly execute a set, or multiple sets, of instructions for performing one or more computer functions.

The computer system 500 may include a processor 502 (representing the processors 204 and 406 in FIGS. 2 and 4), e.g., a central processing unit (CPU), a graphics processing unit (GPU), or both. The processor 502 may be a component in a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually or automatically (i.e., programmed).

The computer system 500 may include a memory 504. The memory 504 may communicate with the computer system 500 via a bus 508. The memory 504 may be a main memory, a static memory, or a dynamic memory. The memory 504 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 504 may include a cache or random access memory for the processor 502. In alternative examples, the memory 504 may be a memory separate from the processor 502, such as a cache memory of a processor, the system memory, or other memory. The memory 504 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 504 may be operable to store instructions executable by the processor 502. The functions, acts or tasks illustrated in the figures or described may be performed by the programmed processor 502 executing the instructions stored in the memory 504. The functions, acts or tasks are independent of the particular type of instructions set, storage media, processor or processing strategy and may be performed by software, hardware, integrated circuits, firm-ware, microcode and the like, operating alone or in combination. However, the processing strategies as described herein are not limited thereto. The processing strategies may include, for example, multiprocessing, multitasking, parallel processing and the like.

As shown, the computer system 500 may further include a display 510, such as a liquid crystal display (LCD), an organic light emitting diode (OLED), a flat panel display, a solid state display, a cathode ray tube (CRT), a projector, a printer or other now known or later developed display device for outputting determined information. The display 510 may act as an interface via which the user may view the functioning of the processor 502, or specifically as an interface with the software stored in the memory 504 or in the drive unit 516.

Additionally, the computer system 500 may include an input device 512 configured to allow a user to interact with any of the components of system 500. The input device 512 may be a number pad, a keyboard, or a cursor control device, such as a mouse, or a joystick, touch screen display, remote control or any other device operative to interact with the computer system 500.

The computer system 500 may also include a disk or optical drive unit 516. The disk drive unit 516 may include a computer-readable medium 522 in which one or more sets of instructions 524, e.g. software, may be embedded. Further, the instructions 524 may embody one or more of the methods or logic as described. In a particular example, the instructions 524 may reside completely, or at least partially, within the memory 504 or within the processor 502 during execution by the computer system 500. The memory 504 and the processor 502 also may include computer-readable media as discussed above.

The present disclosure may be a computer-readable medium that includes instructions 524 or receives and executes instructions 524 responsive to a propagated signal so that a device connected to a network 526 may communicate voice, video, audio, images or any other data over the network 526. Further, the instructions 524 may be transmitted or received over the network 526 via a communication port or interface 520 or using a bus 508. The communication port or interface 520 may be integrated with the processor 502 or may be a separate component. The communication port 520 may be a software or hardware component. The communication port 520 may be configured to connect to a network 526, external media, the display 510, or any other components in system 500 or combinations thereof. The connection to the network 526 may be a physical connection, such as a wired Ethernet connection or may be established wirelessly as discussed later below. Likewise, the additional connections with other components of the system 500 may be physical connections or may be established wirelessly. The network 526 may be directly connected to the bus 508.

The network 526 may include wired networks, wireless networks, Ethernet AVB networks, or combinations thereof. The wireless network may be a cellular telephone network, an 802.11, 802.16, 802.20, 802.1Q or WiMax network. Further, the network 526 may be a public network, such as public Internet, a private network, such as private intranet, or combinations thereof, and may utilize a variety of networking protocols now available or later developed including, but not limited to TCP/IP based networking protocols.

In an alternative example, dedicated hardware implementations, such as application specific integrated circuits, programmable logic arrays and other hardware devices, may be constructed to implement various parts of the system 500.

Applications that may include the systems may broadly include a variety of electronic and computer systems. One or more examples described may implement functions using two or more specific interconnected hardware modules or devices with related control and data signals that may be communicated between and through the modules, or as portions of an application-specific integrated circuit. Accordingly, the present system may encompass software, firmware, and hardware implementations.

The system described may be implemented by software programs executable by a computer system. Further, in a non-limiting example, implementations may include distributed processing, component/object distributed processing, and parallel processing. Alternatively, virtual computer system processing may be constructed to implement various parts of the system.

The system is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

In the following paragraphs, descriptions about example implementations of various features of the invention and a corresponding control flow associated with such features have been provided. It should however be understood that every implementation of as claimed method and apparatus need not follow the example features and steps as described mentioned in the following paragraphs. Thus, the scope of the claims is intended to be restricted based on the basis of the claimed subject matter and its equivalents and not on the basis of the examples provided herein below.

Figure 6:
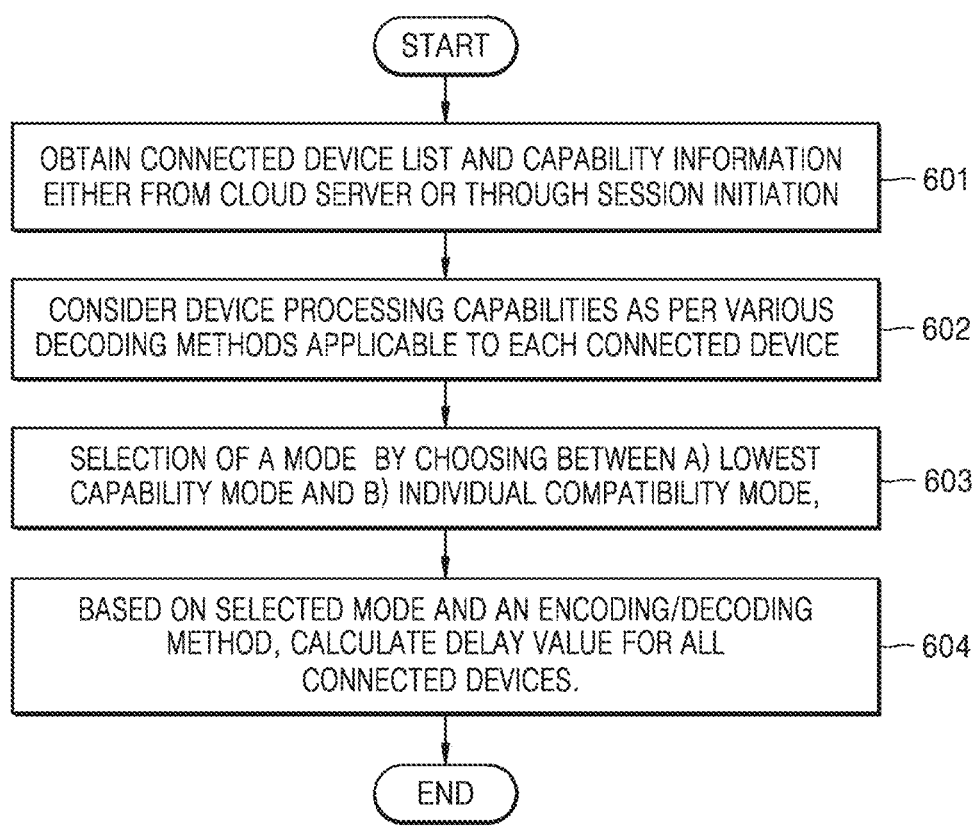
FIG. 6 illustrates an example control flow for gathering a first type of delay information in accordance with the example embodiments of the present disclosure.

FIG. 6 illustrates an example control flow implemented by a source device 200 or a server 400 for gathering a first type of delay information from connected devices (also referred as client devices, receiving devices, or networked devices) in accordance with the example embodiments of the present disclosure. In an example, the first type of delay information may include device capability information and data processing information related to a device.

A stepwise description of the present control flow is as follows:

At Step 601, the source device 200 or server 400 may obtain a list of connected devices and corresponding device capability information. The source device 200 or server 400 may obtain the list of connected devices and corresponding device capability information, for example, either through a cloud based server or by initiating a session with the connected devices. In an example, the capability information may point to a version of a device, technical configuration of the device, composition of the device, cache memory size, type of operating system, supported networking protocol, etc. As many devices in today's world are modular in construction, the capability information is generally segmented according to configuration of device components and sub-components. For example, the capability information of a smart phone is presented in the form of operating system, cache memory, type of processor, screen size, network interfaces (e.g. GSM CSD, EDGE, UMTS 3G, etc.) of the smart phone.

At Step 602, the source device 200 or server 400 may obtain a range of device processing abilities applicable to each of the connected devices in terms of different decoding techniques. The range of device processing abilities may include, for example, processing ability-decoding methods as applicable to connected devices (e.g., information indicating device processing abilities, for example, processing speeds, of connected devices and decoding methods corresponding to the connected devices).

At Step 603, the source device 200 or server 400 may select a device capability mode. The source device 200 or server 400 may select the device capability mode, for example, based on user defined settings. Selection of a capability mode selection may be made with respect to the capabilities of the connected devices, and the selected device capability mode may be used in and act as a determining factor for later calculating a delay value based on the device capability information and device processing information.

When in a first mode, for example, a lowest capability device mode, the source device 200 or server 400 may identify the lowest capability device (i.e. most technically inferior device, device having the lowest processing ability) from the list of connected devices obtained in step 601 and set the configuration and processing ability of the lowest capability device as the first type of delay information for all of the connected devices. Moreover, the source device 200 or server 400 may set a decoding method for all of the connected devices according to a decoding method applicable to the lowest capability device. For example, when the source device 200 or server 400 transmits data to the connected devices, the source device 200 or server 400 may establish a single session with all of the connected devices and transmit content in an encoded form to the connected devices at a rate corresponding to the processing ability of the lowest capability device.

When in a second mode, for example, an individual capability device mode, the source device 200 or server 400 may identify the capability (e.g., processing ability) of each of the connected devices obtained in step 601 and set the decoding method for each of the connected devices according to respective device capability. For example, when the source device 200 or server 400 transmits data to the connected devices, the source device 200 or server 400 may establish respective sessions with the connected devices and transmit content in an encoded form to the connected devices at rates corresponding to respective processing abilities.

Alternatively, when in the second mode, the source device 200 or server 400 may set the decoding method for all of the connected devices according to a common decoding method, rather than setting the decoding method of each of the connected devices according to respective device capability. For example, when the source device 200 or server 400 transmits data to the connected devices, the source device 200 or server 400 may establish respective sessions and transmit content to the connected devices as above, and upon receiving the transmitted content, the connected devices may process the content at rates corresponding to respective processing abilities.

In another example, the source device 200 or server 400 may set the decoding method for each of the connected devices according to, for example, a type of data to be transmitted or type of channel (i.e. wired network, wireless LAN or cloud network) to be used for data transmission. However, the transmission of data and setting of the decoding method as described herein are not limited thereto, and other analogous examples for transmitting content or setting the decoding method may be implemented.

At Step 604, based on the selected mode, the source device 200 or server 400 may calculate a delay value Pd. For example, in the first mode (e.g., lowest capability mode), the source device 200 or server 400 may calculate a single delay value Pd that corresponds to the lowest capability device. However, in the second mode (e.g., individual capability device mode), the source device 200 or server 400 may calculate delay values Pd1, Pd2, Pd3, etc. respectively corresponding to the connected devices and determine a maximum delay value Pd therefrom.

The delay values Pd1, Pd2, Pd3 associated with the capability information and the data processing ability of the devices may be determined statically, dynamically or a combination thereof. The following description covers such static and dynamic determination.

In the case of static determination of a delay value of a device from the capability information, the source device 200 or server 400 may refer to, for example, pre-stored look-up tables or spreadsheets to find a value mapped to pre-defined device capability information. In another example, the source device 200 or server 400 may refer to various offline or online prediction systems that instantly predict the delay of a device based on device capability information.

In the case of static determination of a delay value (e.g., a data processing time period) from data processing information, the source device 200 or server 400 may determine the delay value based on a type of decoding technique currently applicable for decoding the data. In further examples of static determination, the source device 200 or server 400 may determine the delay value based on a type of data to be received, use of a decompression technique generally applied to the data by the device, type of decompression technique generally applied to the data by the device, use of a currently applicable decoding technique for decoding of the data by the device, etc. In another example of static determination, source device 200 or server 400 may determine the delay based on data processing information from the lookup tables or spreadsheets.

In the case of static determination of a delay value based on device capability and data processing ability, the source device 200 or server 400 may consider various factors that vary with time. The source device 200 or server 400 may consider factors that directly or indirectly affect both the device capability and processing ability of the device. For example, the source device 200 or server 400 may consider atmospheric conditions like temperature around the devices. In another example, the source device 200 or server 400 may consider whether the device is in an idle or active state.

In the case of dynamic determination of a delay value (e.g., a data processing time period), the source device 200 or server 400 may determine the delay value based on a state of the device. For example, the receiving device may be a laptop or a computer simultaneously undertaking various tasks (e.g. receiving system updates from the internet, running a voice calling application). As a device when in an idle state may be able to receive more content than when in a highly active state, a device having a given device capability is expected to have a shorter data processing time while in an idle state. On the other hand, when the same device is in a highly active state, the device usually exhibits a longer data processing time. Furthermore, in the case of dynamic determination of a delay value of the device, the source device 200 or server 400 may determine the available cache/permanent memory of the device and determine the delay value based thereon.

In the case of dynamic determination of a delay value of a device from the capability information, the source device 200 or server 400 may determine the location of the device and determine the delay value based thereon. For example, a device may be able to receive audio data packets more efficiently than video data packets while located in a basement, whereas the same device may be able to receive audio and video data packets at the same rate while in a different location, for example, while located at ground level. Accordingly, the determined delay value of the device may differ based on the location of the device. In such a scenario, in the case of dynamic determination of a delay value of the device, the source device 200 or server 400 may determine the location of the device and determine the delay value based thereon.

Furthermore, it will be understood that the source device 200 or server 400 may dynamically determine the delay value of the device based on capability and data processing ability of the device in relation to factors or parameters other than those described above.

It may be once again understood that, an overall delay value as calculated (dynamically, statically, or a combination thereof) based on the device capability and processing ability may be represented as Pd, as already described above regarding step 604.

Figure 7:
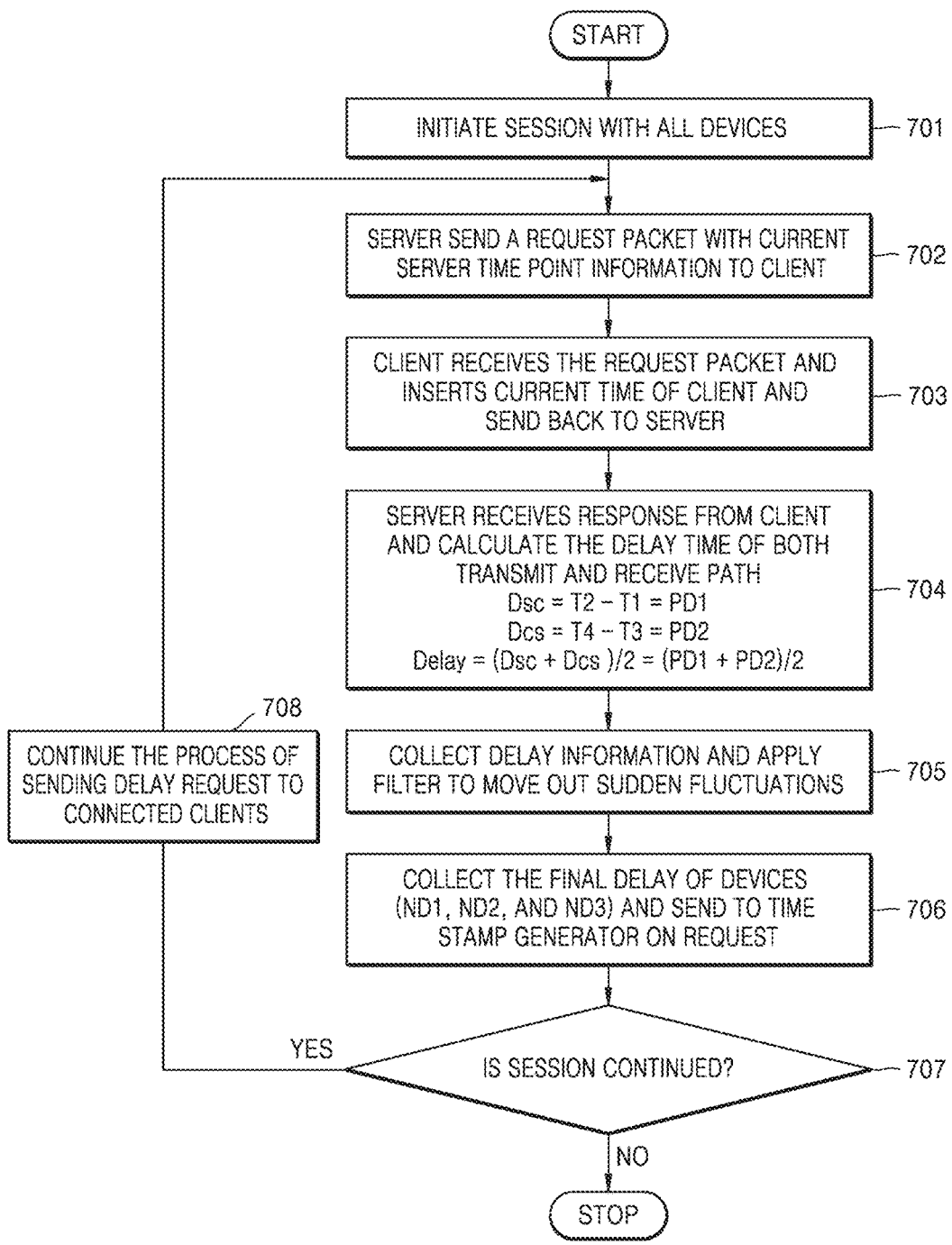
FIG. 7 illustrates an example control flow for gathering a second type of delay information in accordance with the example embodiments of the present disclosure.

FIG. 7 illustrates an example control flow implemented by the source device 200 or server 400 for gathering a second type of delay information in accordance with the example embodiments of the present disclosure. Said second type of delay information may include, for example, a network delay (i.e., a network propagation time). The network delay may include an amount of time for transmission of data between the source device 200 or server 400 and a connected device and an amount of time for receiving acknowledgment indicating receipt of the transmitted data.

At Step 701, the source device 200 or server 400 may initiate a session with the connected devices. As described above, the source device 200 or server 400 may initiate a single session with all the connected devices device or individual sessions with the connected devices.

At Step 702, the source device 200 or server 400 send a request packet (e.g., a data packet including test data) with a current server time point (T1) information to the connected devices. The request packet may include a fraction of data intended to be transmitted to the connected devices during the data transmission. Accordingly, the transmission of the request packet may assist the source device 200 or server 400 in diagnosing network connections between the source device 200 or server 400 and the connected devices.

At Step 703, upon receiving the request packet, a client (e.g., a connected device) may affix a timestamp indicating a time point (T2) when test data is received and a time point (T3) indicating when the data packet is sent back to the source device 200 or server 400. Accordingly, the data packet as sent back to the source device 200 or server 400 may include the time points T1, T2, and T3 and is received by the source device 200 or server 400 at time point T4.

At Step 704, the source device 200 or server 400 may calculate the elapsed time from when the source device 200 or server 400 transmits the request packet until the source device 200 or server 400 receives the packet back from the client. In other words, the network delay calculated by the source device 200 or server 400 takes into consideration the transmission time from the source device 200 or server 400 to the client and from the client back to the source device 200 or server 400.

An example sequence (a, b, c) leading to overall delay calculation is provided as follows:

$$Dsc=T2-T1=PD1 \quad \text{a.}$$

$$Dcs=T4-T3=PD2 \quad \text{b.}$$

$$Delay=(Dsc+Dcs)/2=(PD1+PD2)/2 \quad \text{c.}$$

Figure 8:
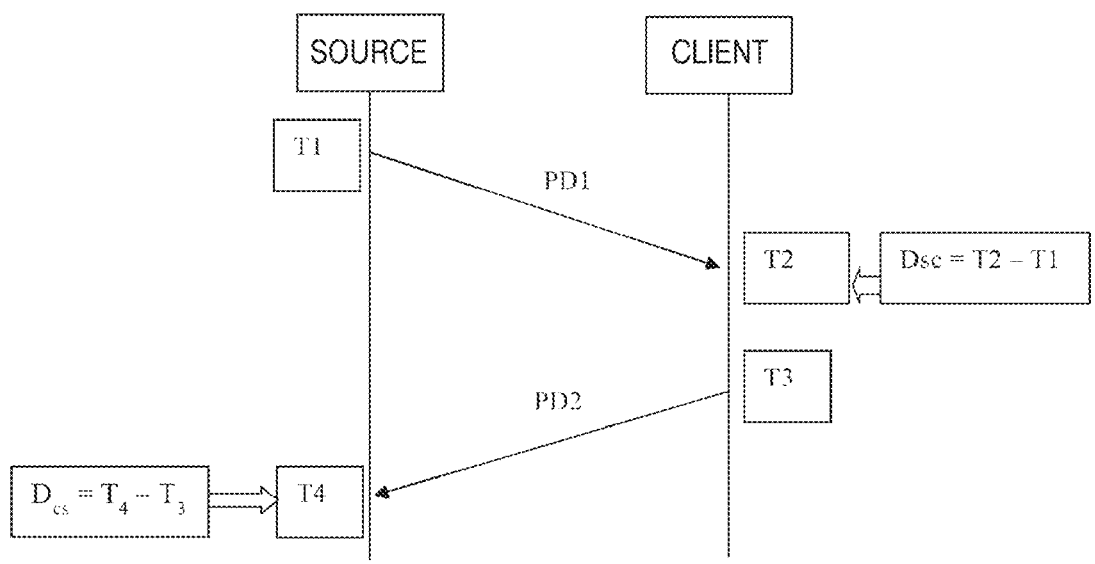
FIG. 8 illustrates an exemplary control flow of a sub-block of FIG. 7.

The aforesaid sequence of Step 704 is further depicted in FIG. 8. Referring to FIG. 8, Dsc denotes a time period with respect to a forward path, i.e. from the source device 200 or server 400 to the client, and Dcs denotes a time period with respect to backwards path, i.e. from the client to the source device 200 or server 400. T1 denotes a time point when the source device 200 or server 400 sends a request (e.g., request packet), T2 denotes a time point when the client receives the request, T3 denotes a time point when the client sends a response packet back to the server, and T4 denotes a time point when the server receives the response packet. Accordingly, a mean value of Dsc and Dcs may be calculated as a network delay (Nd1) between the server and a first client. Likewise, network delays (Nd2, Nd3, . . . ) may also be calculated with respect to other clients (i.e., connected devices). The aforesaid parameters PD1 and PD2 calculated in the sequence a-b-c may be referred as network propagation related information.

Further, in order to assist the aforesaid network delay calculation through the aforesaid sequence, the clocks of the source device 200 or server 400 and client may be synchronized with each other using any known synchronization protocol.

The aforesaid explanation depicts a static determination of a network delay between the source device 200 or server 400 and a connected device. However, the network delay may also be determined dynamically in consideration of various factors that vary with time. For example, in addition to PD1 and PD2, other factors may also be taken into account during dynamic determination of the network delay, such as current atmospheric conditions surrounding the network, the number of obstacles between the server 400 and the connected device, distance between the source device 200 or server 400 and the connected device, etc.

At Step 705, the network delays (Nd2, Nd3, Nd3 . . . ) calculated in step 704 may be further processed to remove any inadvertent fluctuations, thereby increasing the accuracy of the calculated network delays. In an example, the fluctuations may be removed by applying a 2-tap filter function as follows:

$$Y[n]=ax[n]+(1-a)y[n-1]$$

Where $Y[n]$—Output $X[n]$—Current delay $Y[n-1]$—Previous delay

Further, as an ancillary step included in the calculation of the network delay with respect to the source device 200 or server 400 and each connected device (e.g., network delays Nd1, Nd2, Nd3 . . . ), a variation in each network delay may be calculated either over a pre-defined time period (e.g., 5 minutes) or for the first 10 test data packets transmitted between the source device 200 or server 400 and each connected device. Such variation may be referred to as a network threshold time period Pth.

At step 706, a maximum network delay value is selected from among Nd1, Nd2, and Nd3 and is applied to all the connected devices as a common network delay value Pn for synchronization purposes.

At step 707, the source device 200 or server 400 may ascertain whether any sessions are still established between the source device 200 or server 400 and the connected devices. If yes, then after a pre-set time period elapses, the source device 200 or server 400 may send an additional data test data packet at step 708, and accordingly steps 701 to 706 are repeated. Otherwise, the network delay calculation ends. Specifically, as long as the network session is still established, the network delay value may be re-calculated at various time intervals by sending test data packets periodically.

Figure 9:
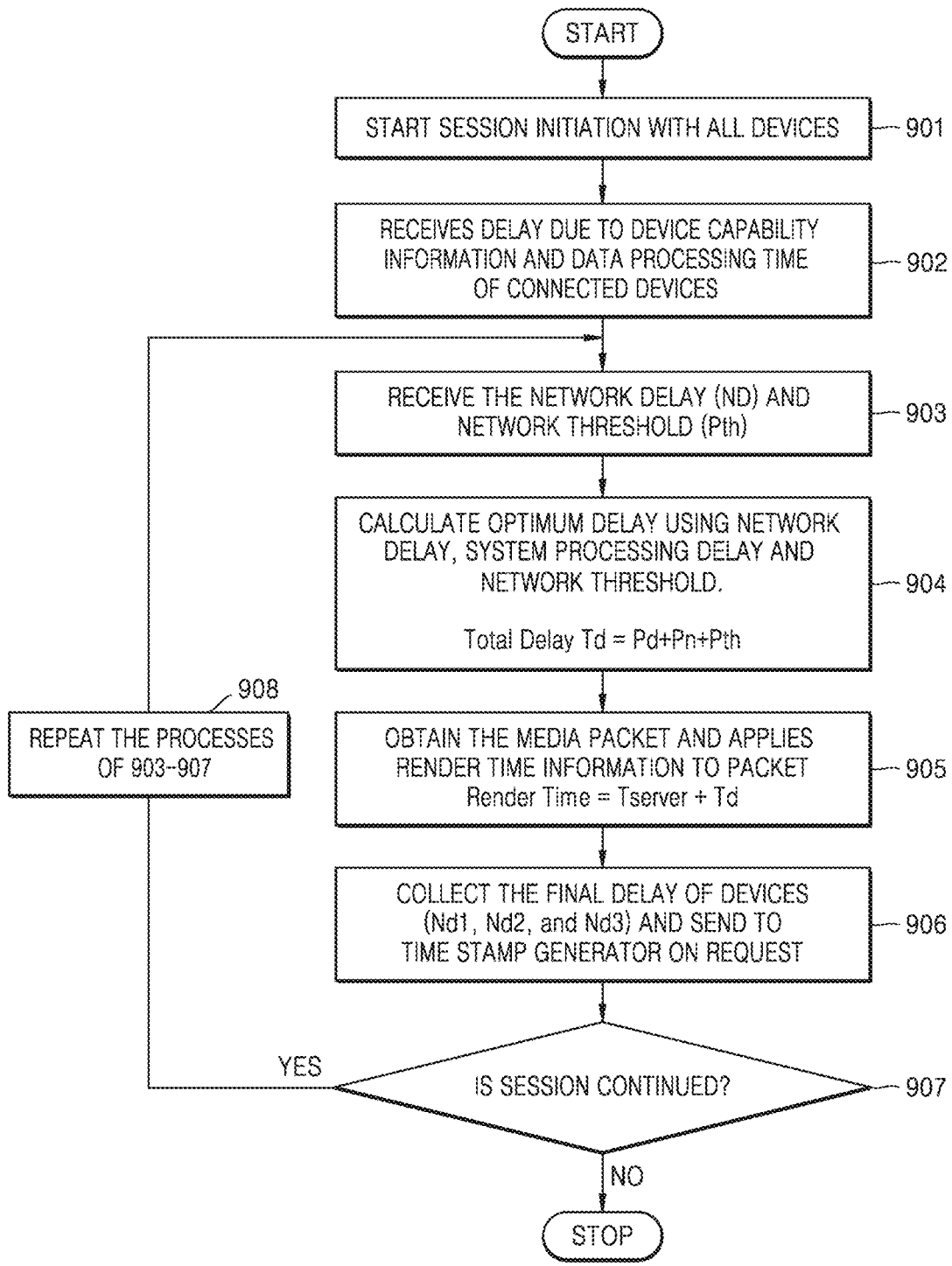
FIG. 9 illustrates an example control flow for calculating a delay value based on the information obtained in FIGS. 6 and 7.

FIG. 9 illustrates an example control flow for calculating a final delay value as applicable to all of the connected devices. The final delay value is calculated from the delay values Pd and Pn calculated under FIG. 6 and FIG. 7.

At step 901, the source device 200 or server 400 may initiate a session with the connected devices. As described above, the source device 200 or server 400 may initiate a single session with all the connected devices device or individual sessions with the connected devices.

At step 902, the source device 200 or server 400 may take into consideration the delay value Pd as obtained according to FIG. 6. As described above, Pd may represent an overall delay based on the capability information and the data processing time period.

At step 903, the source device 200 or server 400 may take into consideration the overall network delay value Pn and network threshold value Pth as obtained according to FIG. 7.

At step 904, the source device 200 or server 400 may calculate a time value Td based on Pd, Pn and Pth.

At step 905, a server delay time Tserver, which is specific to the characteristic delay exhibited by the source device 200 or server 400 is also taken into consideration. Accordingly, the source device 200 or server 400 may calculate a rendering time based on the Td and Tserver and affix a time-stamp based on the rendering time to a data packet (i.e., request packet) to be sent to one or more of the connected devices.

In another example, rather than affixing such a timestamp to the data packet, the transmission of data packets may be timed based on a timestamp maintained by the source device 200 or server 400. Such a scenario is described later below in the description of FIG. 18, FIG. 19 and FIG. 20. Moreover in such a scenario, a plurality of rendering times (T1, T2, T3) may be calculated instead of a single rendering time as calculated above. The rendering times T1, T2 and T3 correspond to pairs of Pd1-Nd1, Pd2-Nd2, and Pd3-Nd3, respectively. Accordingly, during such a scenario, there would not be any selection of a maximum or common value like Pd or Pn, but rather, device specific values are focused upon. However, the other values like Pth and Tserver, may remain non-specific to the receiving devices or client devices.

Steps 906 and 907 and are almost similar to steps 706 and 707 of FIG. 7, and repeated descriptions are omitted. At Step 908 of FIG. 9, in addition to sending additional data packets including test data to the connected devices as in step 708 of FIG. 7, the source device 200 or server 400 may affix timestamps to the additional test data packet. Accordingly, in line with every periodic calculation of the overall network delay Nd as performed in FIG. 7, a timestamp is corresponding to the calculation is generated and affixed to each data test packet to be sent.

Figure 10:
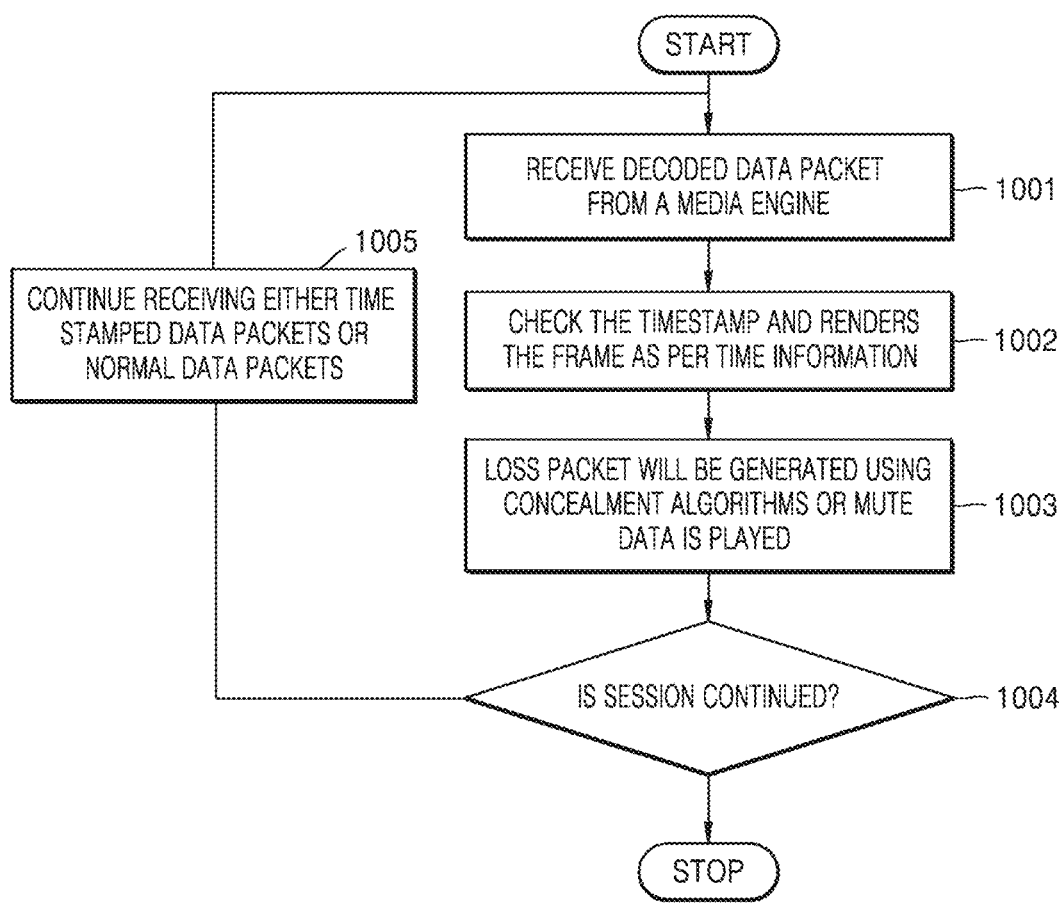
FIG. 10 illustrates an example control flow for synchronizing the networked devices in accordance with the example embodiments of the present disclosure.

FIG. 10 illustrates an example control flow for synchronizing the networked devices in accordance with the example embodiments of the present disclosure. More specifically, the present figure illustrates the process within a receiving device after the data packet affixed with the time step (as illustrated in FIG. 9) has been received. As a prerequisite, clock of the receiving device may remain synchronized with the source device 200 or server 400 using any known synchronization protocol.

A media engine may decode the data packet affixed with the timestamp and generate a decoded frame. At step 1001, one of the networked devices may receive the decoded frame from the media engine and place the decoded data packet in a render queue along with the timestamp for later playback. In other words, one or more of the networked devices may receive the decoded data packet and store the same in a playback buffer. Such scenarios are described below in the descriptions of FIG. 13 through FIG. 17.

However, in the event a networked device which receives the data packet (i.e., the receiving device) is unable to queue or buffer the decoded data packet or is unable to process timestamp information, then the source device 200 or server 400 may choose not to affix a timestamp to the data packet to be sent to the receiving device. Accordingly, such a networked device may render the data packet immediately after decoding. Such scenarios are described below in the descriptions of FIG. 18 through FIG. 20.

At step 1002, a rendering module included in the receiving device checks the timestamp associated with the decoded data packet (in the event the receiving device supports buffering), extracts the timestamp, and may render the decoded data in accordance with a timeline which is provided in the timestamp and corresponds to the decoded data. In other words, rendering of the data included in the decoded data packet is performed in accordance with the timeline provided in the extracted timestamp. The synchronization of the receiving device with the source device 200 or server 400 as a result of such rendering may be referred as "buffering enabled synchronization".

In another example scenario, when the receiving device does not support buffering or does not understand the timestamp, then the rendering module may render the data packet immediately after decoding. The synchronization of the receiving device with the source device 200 or server 400 as a result of such rendering may be referred as "active synchronization".

At step 1003, in the event a data packet loss has been detected, then the receiving device may generate a data packet corresponding to a lost data packet by using concealment algorithms, rather than sending a request to the source device 200 or server 400 for retransmission of the lost data packet. Needless to say, the receiving device may send a request to the source device 200 or server for retransmission of the lost data as an alternative implementation.

At step 1004, the source device 200 or server 400 may ascertain whether any sessions are still established between the source device 200 or server 400 and the connected devices. If yes, then the flow proceeds to Step 1005, in which the connected devices continue to receive further data packets (whether time-stamped or not). Otherwise, the control flow ends.

Figure 11:
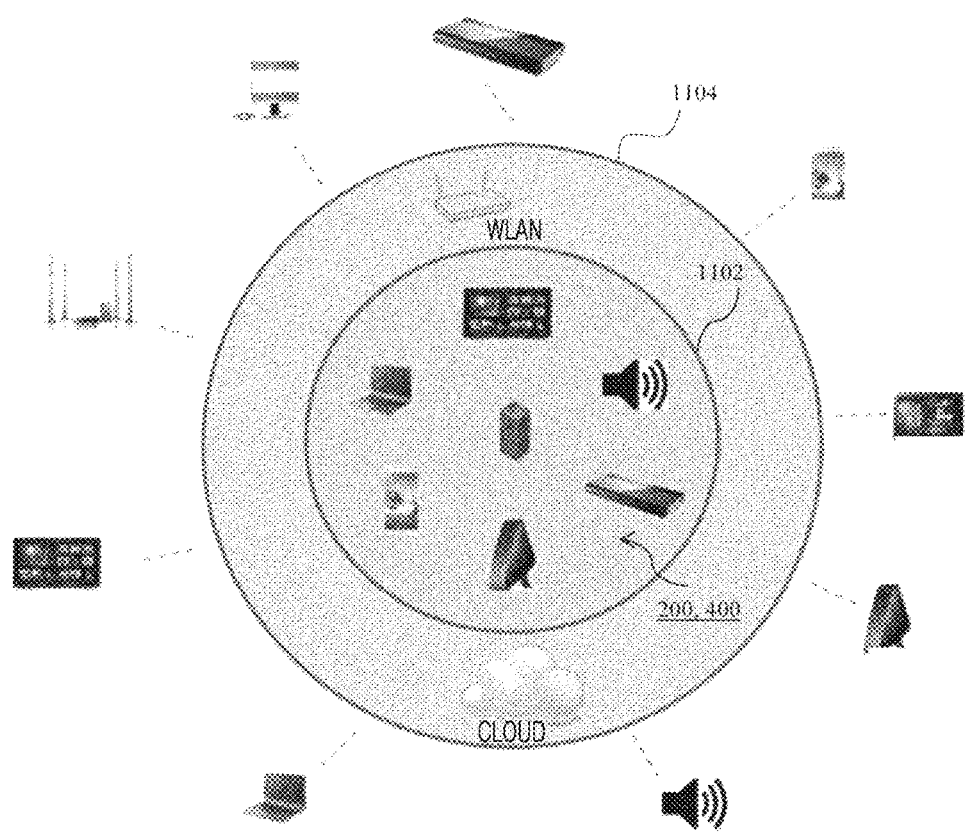
FIG. 11 illustrates an example network implementation of the apparatuses described in the aforesaid two embodiments of the present disclosure.

FIG. 11 illustrates an example network implementation of the apparatuses 200, 400 described in the aforesaid two embodiments of the present disclosure.

As explained before, the apparatus 200 or server 400 denotes a set of example components that either act as the source device 200 or server 400. The innermost concentric circle 1102 represents a set of example components that may function as the source device 200 or server 400. The source device 200 or server 400 may be communicatively connected to one or more receiving devices represented by a set of devices encircling the outermost concentric circle 1104. Further, the communication between the source device 200 or server 400 and the receiving devices may be facilitated through wireless LAN networking (e.g. through wireless routers) or cloud computing.

Figure 12:
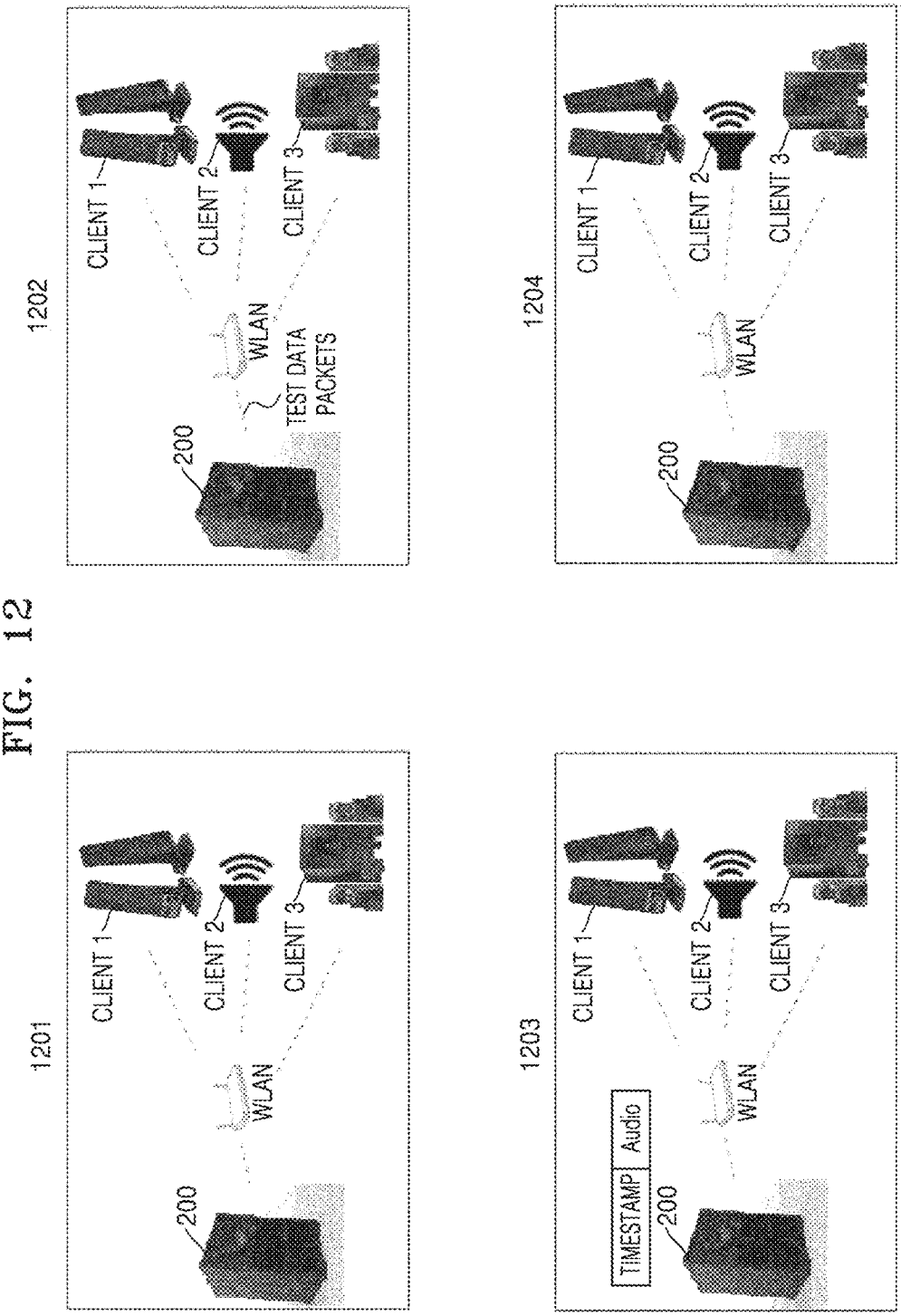
FIG. 12 illustrates an example network environment in which audio devices are synchronized.

FIG. 12 illustrates an example in which audio devices are synchronized. In addition, a four-step sequence of steps 1201 through 1204 has been depicted to illustrate an example in which a single source device 200 achieves audio synchronization across multiple devices (e.g., client devices 1, 2, and 3) connected to the single source device 200.

While each of the steps 1201 and 1202 as depicted in the present figure individually represent an entire control flow representation of FIG. 6 and FIG. 7, the steps 1203 and 1204 of the present figure collectively represent the control flow of FIG. 9.

Figure 13:
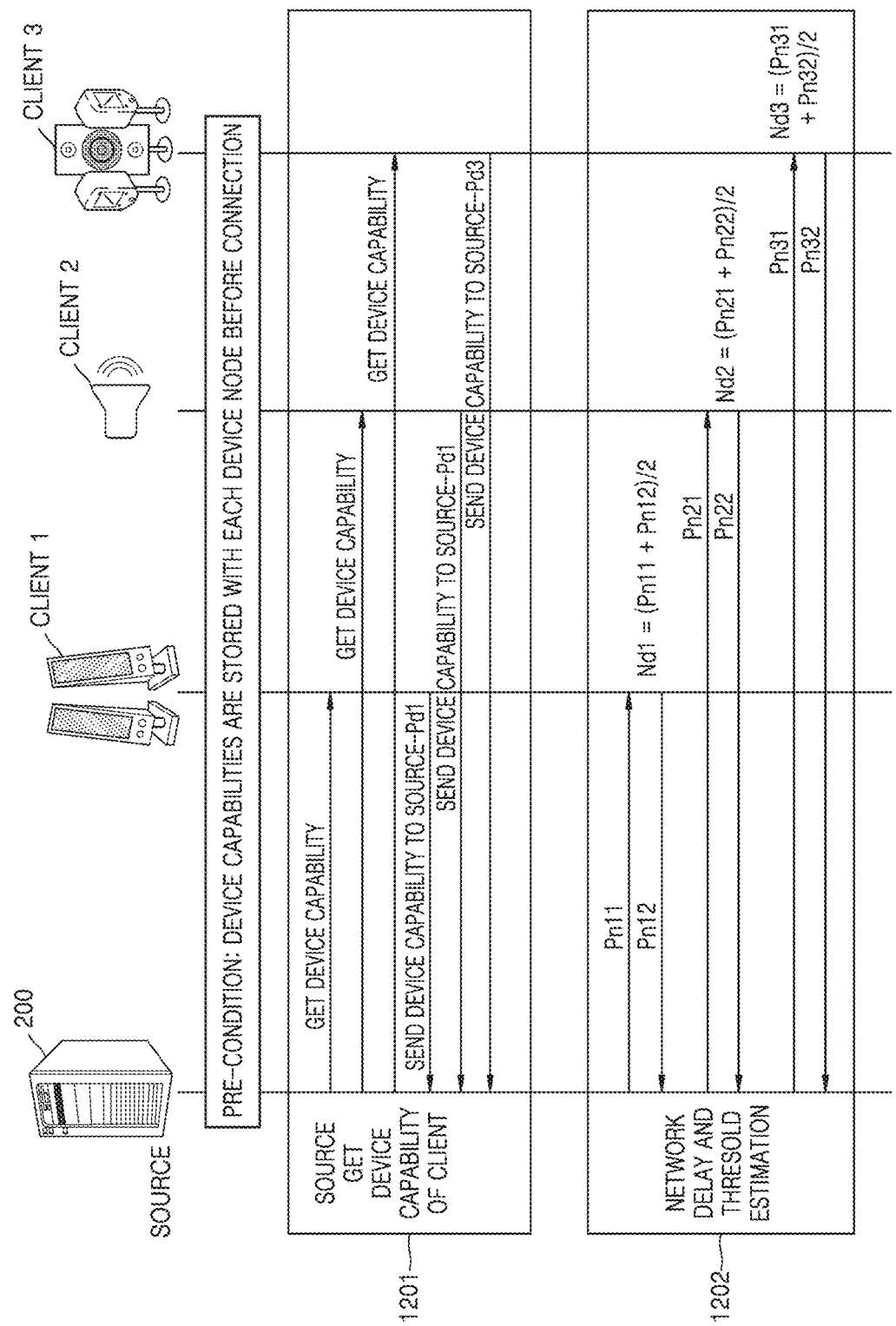
FIG. 13 illustrates a sequence of initial steps involved in the synchronization of the audio devices illustrated in FIG. 12.
Figure 14:
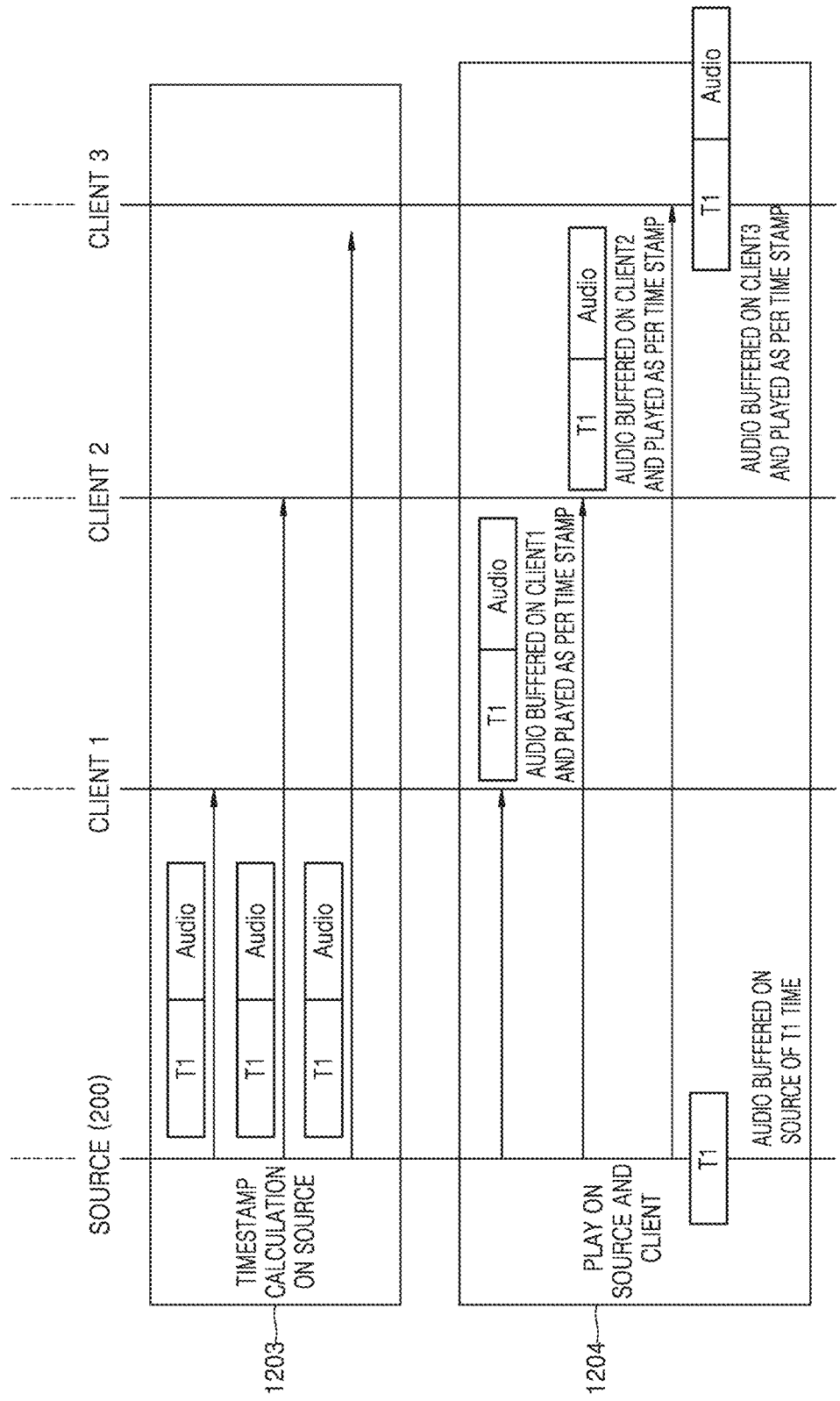
FIG. 14 illustrates a sequence of later steps involved in the synchronization of the audio devices illustrated in FIG. 12.

FIGS. 13 and 14 are diagrams illustrating the aforesaid steps 1201-1204 of FIG. 12.

As shown in step 1201 of FIG. 13, the source device 200 sends a request to client devices 1, 2 and 3 for device capability information and in response receives respective device capability information from the client devices 1, 2, and 3. Thereafter, the source device 200 calculates the values, Pd1, Pd2, and Pd3 (Refer to FIG. 6) with respect to each of the client devices 1, 2, and 3. Here, the term 'device capability' denotes both device capability information and data processing information related to the client devices 1, 2 and 3.

As shown in step 1202, the source device 200 sends test data packets to each of the client device 1, 2, and 3, and receives back the data packets from the client devices 1, 2, and 3 as an acknowledgement. Such sending and receiving is facilitated through either a single session with all client devices 1, 2 and 3 or individual sessions with the client devices 1, 2 and 3. Accordingly, the network delay values Nd1, Nd2, Nd3 are calculated (Refer FIG. 7 and FIG. 8) with respect to the client devices 1, 2 and 3. Thereafter, as also explained in FIG. 7, the source device 200 may process the network delay values by removing fluctuations, select a maximum network delay Pn from among the processed values Nd1, Nd2 and Nd3, and further calculate a network threshold value Pth.

At step 1203 as illustrated in FIG. 14, the source device 200 calculates a common timestamp T1 (or a rendering time) applicable to each of the client devices 1, 2, and 3, such that the calculated timestamp bears a common timeline for the client devices 1, 2 and 3. Such a timestamp is calculated based on the received delay values Pd, Pn, as well as the network threshold value Pth, and a source-specific delay value(time) Tserver. Step 905 of FIG. 9 may be referred to for reference. Further, as the timestamp T1 as calculated is common to all devices, the timing value as generated may be non-specific to devices in terms of device capability and specific network delay (Nd1, Nd2 or Nd3).

At step 1204 as illustrated in FIG. 14, the data packets affixed with the timestamp T1 are sent to the client devices 1, 2, and 3. As a result, the audio data communicated by the source device 200 is buffered at each of the client devices 1, 2 and 3, wherein a buffering rate may differ between client devices. However, as the timestamp T1 is common, the audio data is played back by client devices 1, 2, and 3 at the same time. Moreover, the source device 200 also plays the audio data in accordance with the timestamp T1. As a result, audio playback is synchronized among all devices in the network, e.g., source device 200 and client devices 1, 2, and 3.

Figure 15:
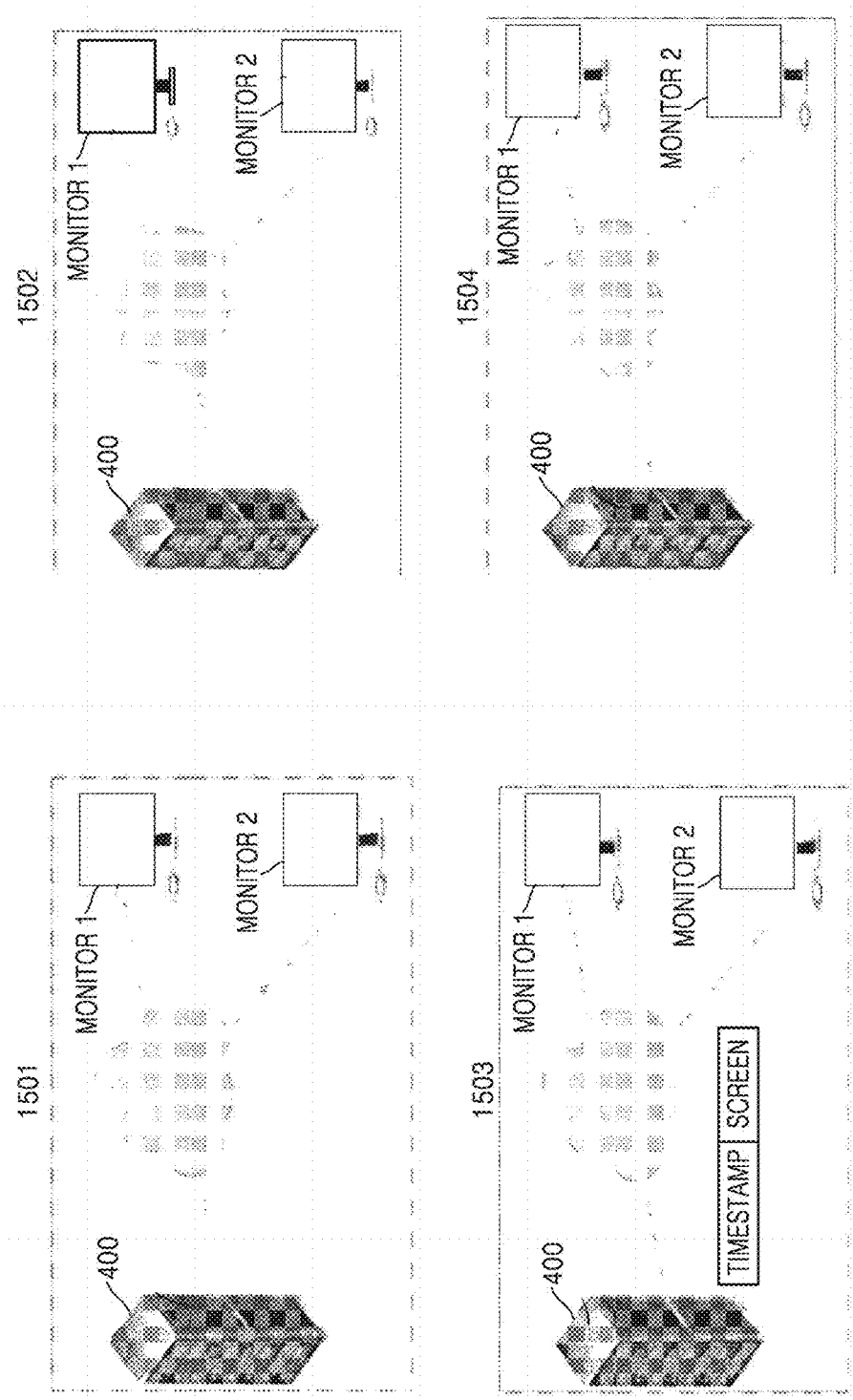
FIG. 15 illustrates an example network environment in which display devices are synchronized.

FIG. 15 illustrates an example in which cloud monitors 1 and 2 are synchronized through the server 400. In addition, a four-step sequence of steps 1501 through 1504 has been depicted to illustrate an example in which the server 400 achieves video synchronization across multiple devices (e.g., cloud monitors 1 and 2) connected to the server 400.

While each of the steps 1501 and 1502 as depicted in the present figure individually represent an entire control flow representation of FIG. 6 and FIG. 7, the steps 1503 and 1504 of the present figure collectively represent the control flow of FIG. 9.

Figure 16:
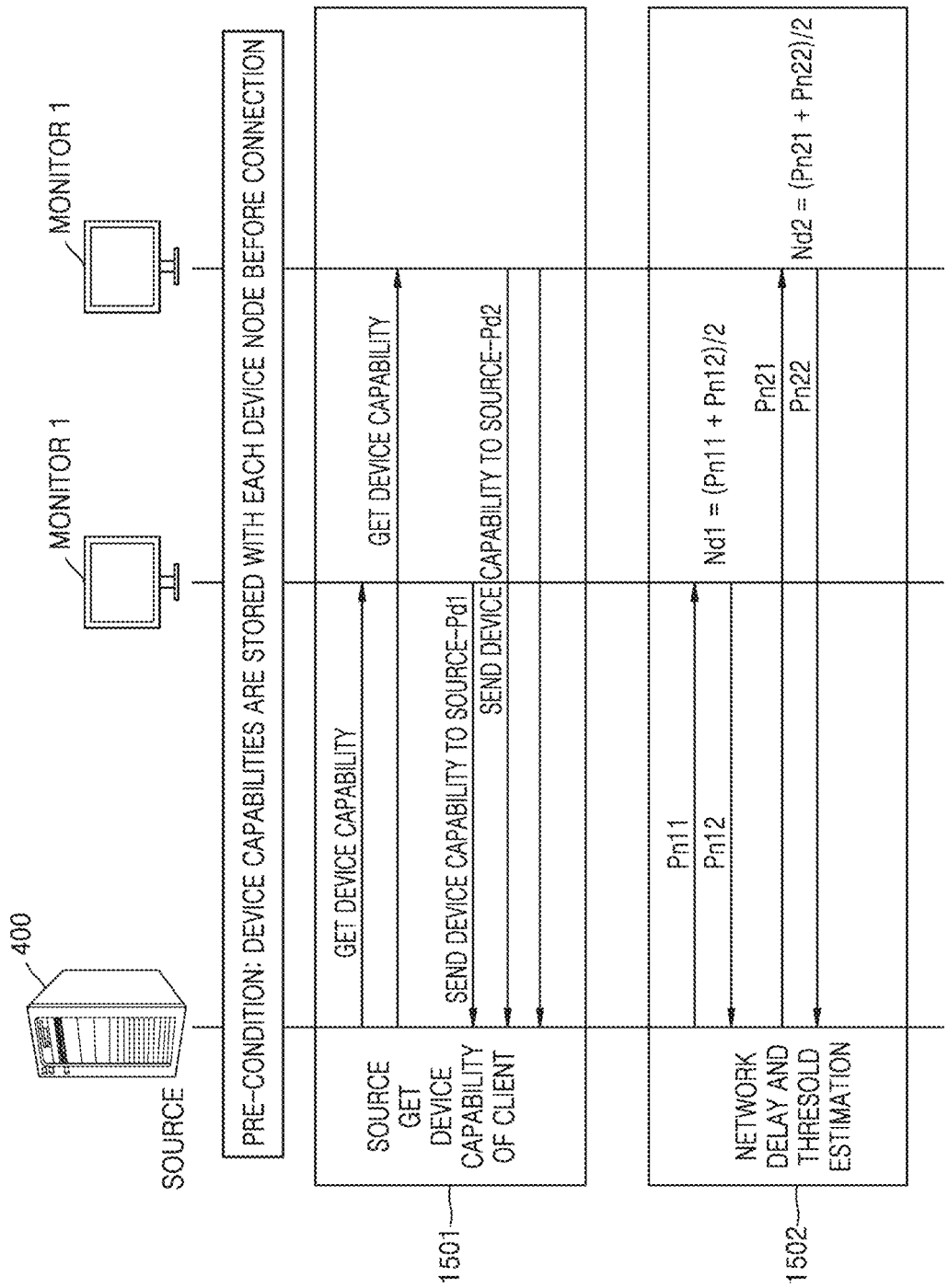
FIG. 16 illustrates a sequence of initial steps involved in the synchronization of the display devices illustrated in FIG. 15.
Figure 17:
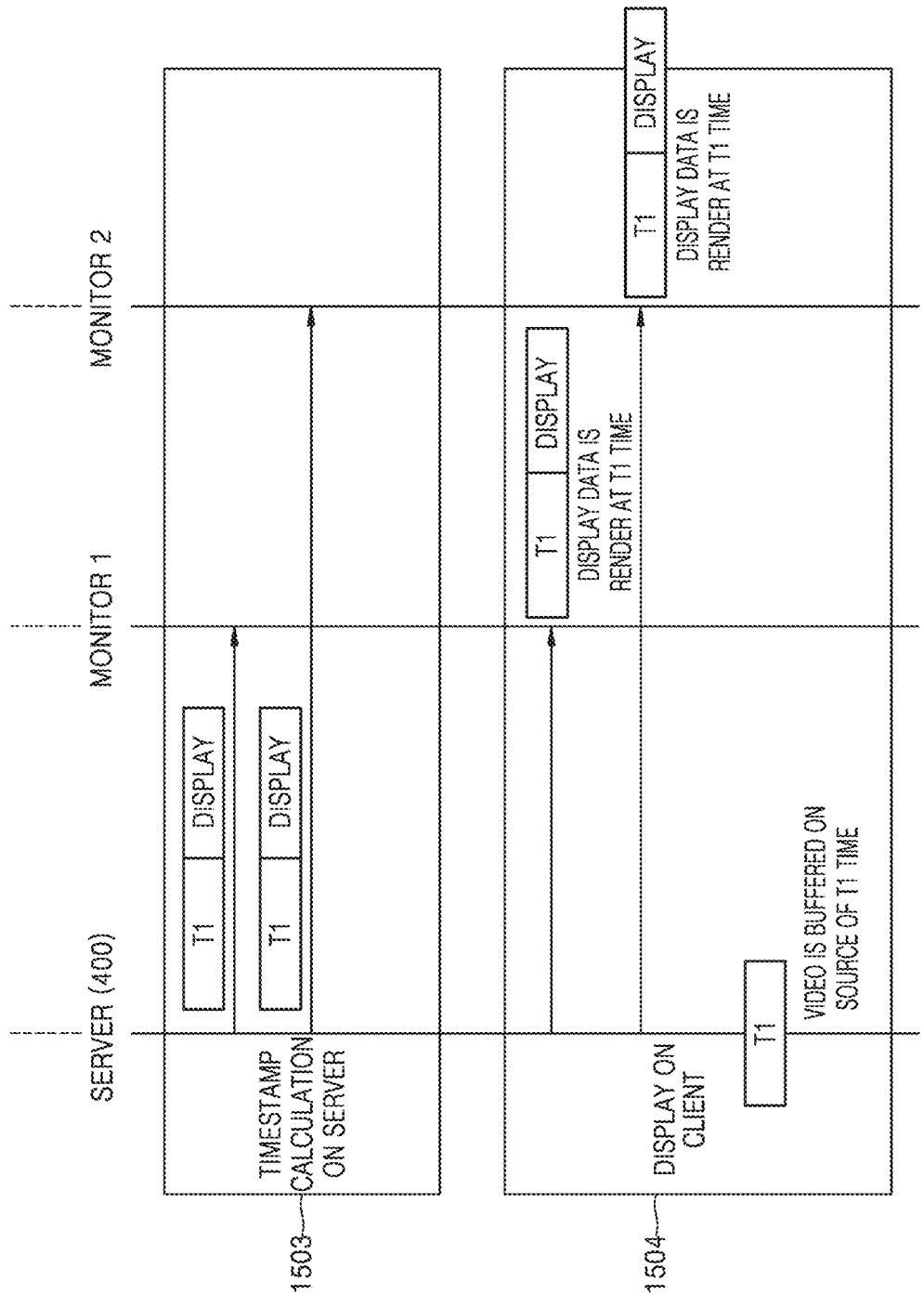
FIG. 17 illustrates a sequence of later steps involved in the synchronization of the audio devices illustrated in FIG. 15.

FIG. 16 and FIG. 17 are diagrams illustrating the aforesaid steps 1501-1504 of FIG. 15 diagrammatically. While the values Pd1, Pd2, Nd1, and Nd2 are calculated in accordance with FIG. 6, FIG. 7 and FIG. 8, the timestamp T1 is calculated in accordance with FIG. 9. As a result, the video data synchronization as assisted by the server 400 ensures that the video data is played at the source and the monitors 1, 2 in accordance with the calculated timestamp T1.

It will be understood that the FIGS. 13-17 represent source-enabled synchronization in a network in which the synchronization benefits from a buffering ability at a networked device which receives audio or video data (i.e., the receiving device). Accordingly, as evident, the receiving device may buffer the content and playback the same based on timestamp information. Such synchronization may be referred to as buffering-based synchronization.

However, in the event the receiving devices are unable to buffer the received content or unable to process the timestamp information, then the source device 200 may transmit the content at different times to the receiving devices, such that playback of the content is synchronized across all receiving devices. Such type of synchronization may be referred as active synchronization, as the source plays a more pro-active role in achieving synchronization. An example representation of the active synchronization has been depicted within FIG. 18 to FIG. 20.

Figure 18:
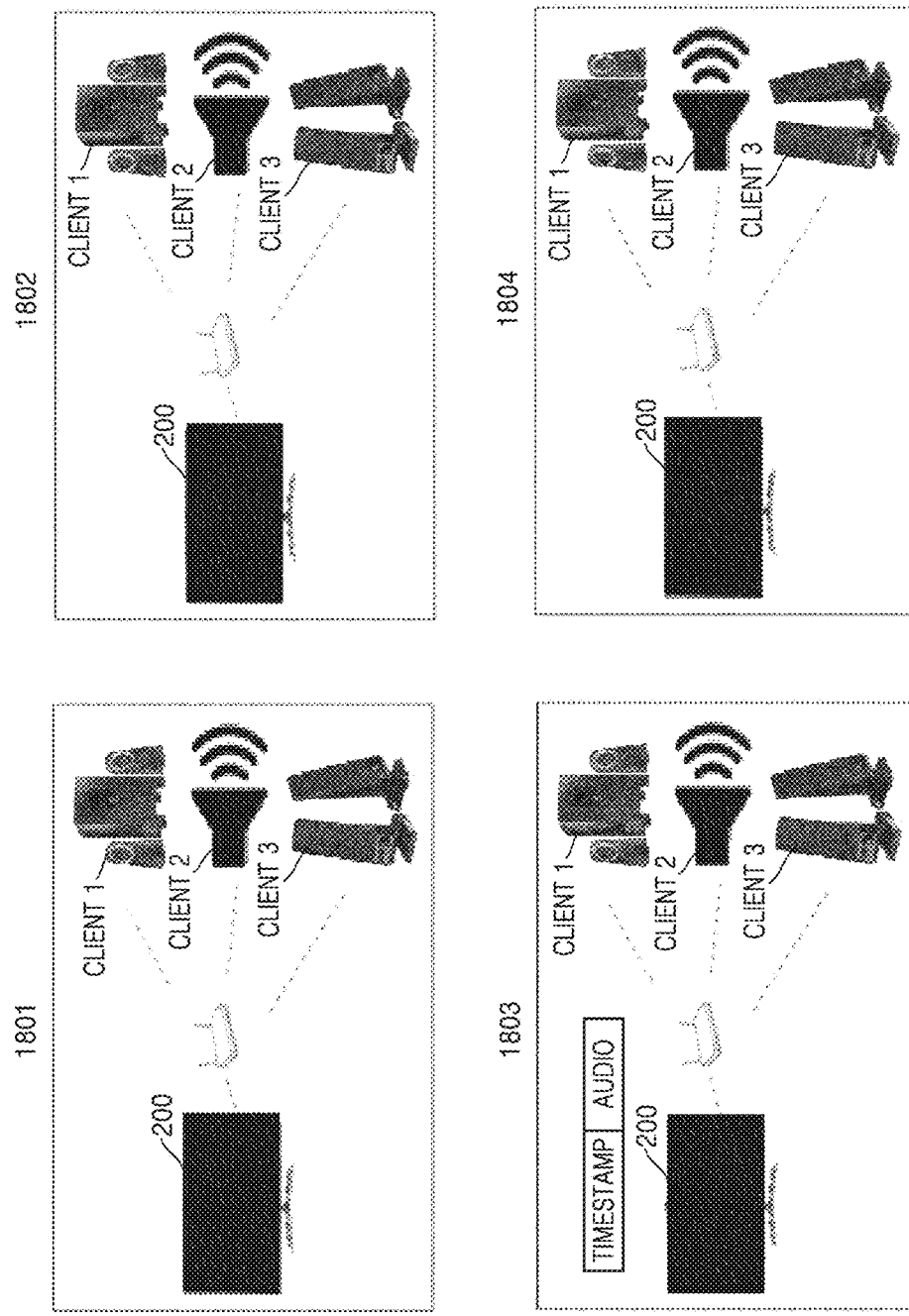
FIG. 18 illustrates an example network environment in which audio and video devices are synchronized.

FIG. 18 illustrates an example in which a source device 200 and client devices 1, 2, and 3 are synchronized through the source device 200, such that video playback at the source device 200 and audio playback by the client devices 1, 2, and 3 are synchronized. In addition, a four-step sequence of steps 1801 through 1804 has been depicted to illustrate an example in which a single source device 200 achieves audio-video synchronization across multiple devices (e.g., client devices 1, 2, and 3) connected to the single source device 200.

While each of the steps 1801 and 1802 as depicted in the present figure individually represent an entire control flow representation of FIG. 6 and FIG. 7, the steps 1803 and 1804 of the present figure collectively represent the control flow of FIG. 9.

Figure 19:
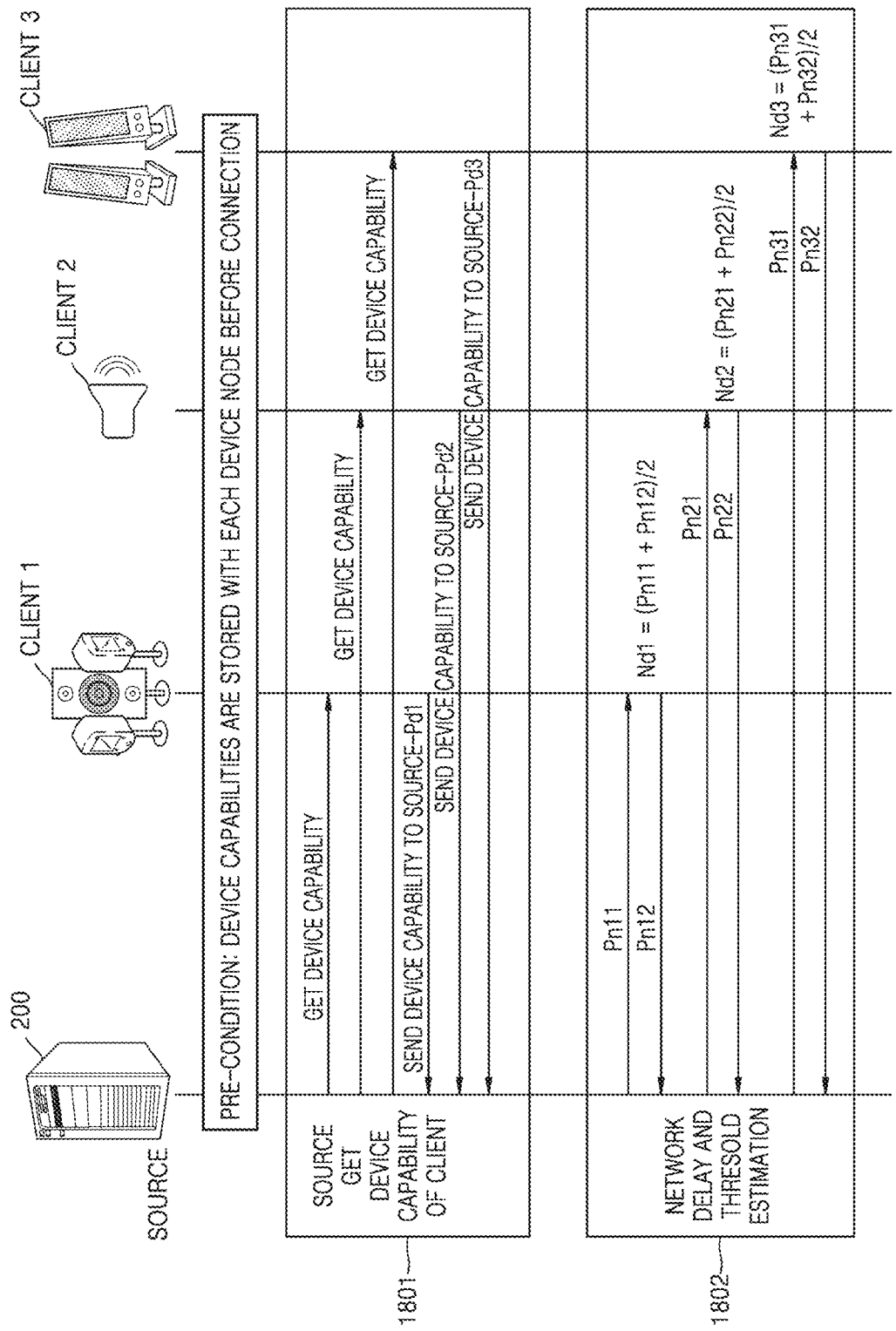
FIG. 19 illustrates a sequence of initial steps involved in the synchronization of the audio and video devices illustrated in FIG. 18.
Figure 20:
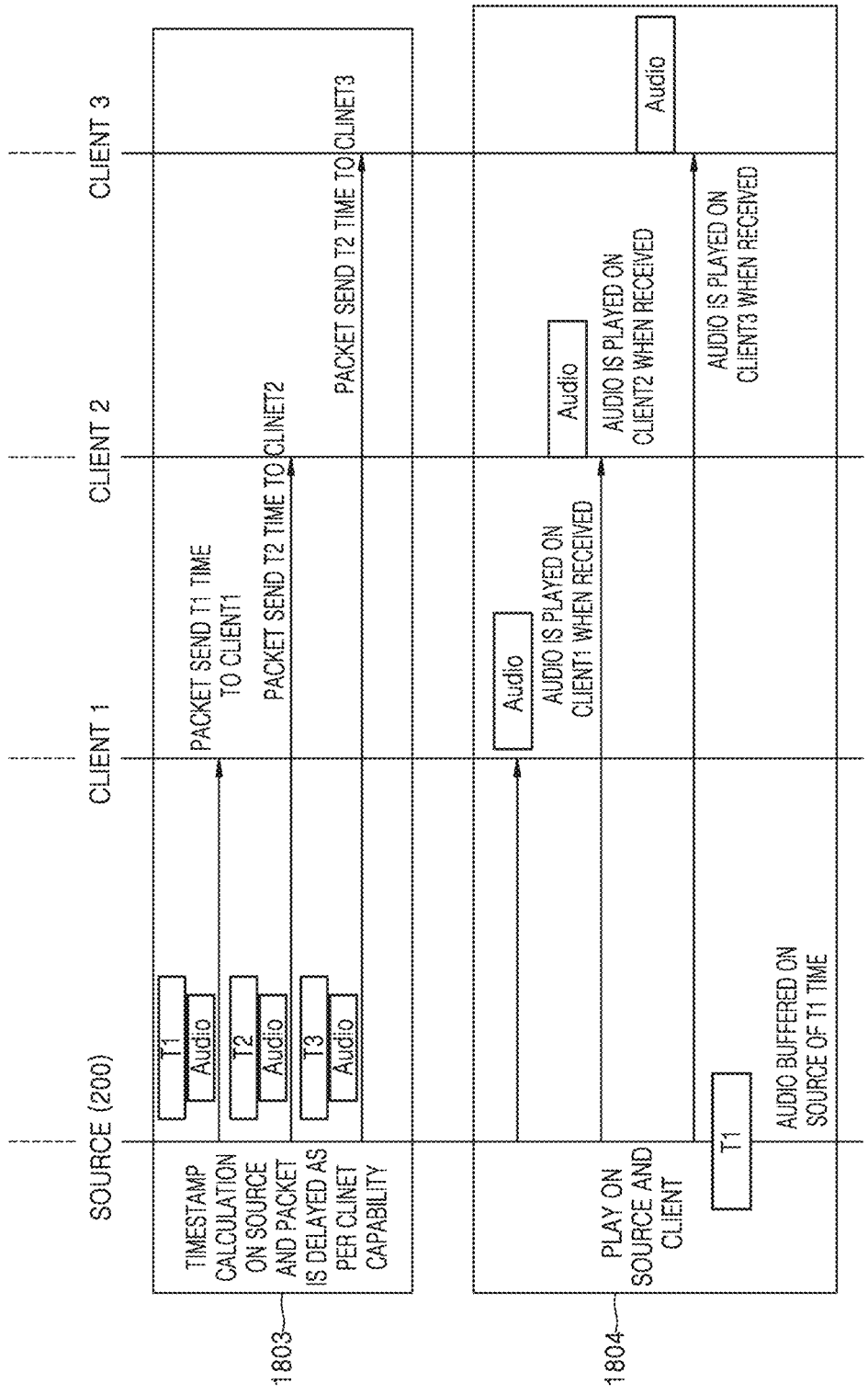
FIG. 20 illustrates a sequence of later steps involved in the synchronization of the audio and video devices illustrated in FIG. 18.

FIG. 19 and FIG. 20 are diagrams illustrating the aforesaid steps 1801-1804 of FIG. 18 diagrammatically. In FIGS. 19 and 20, instead of sending timestamps affixed to the data packets, the source device 200 transmits the audio data to the client devices 1, 2, and 3 at different times. Due to this reason, the source device 200 calculates individual timestamps (T1, T2, T3) for each of the client devices 1, 2, and 3 based on individual sets of values Pd1-Nd1, Pd2-Nd2, Pd3-Nd3, and Pth. While the values Pd1, Pd2, Nd1, Nd2 are calculated in accordance with FIG. 6, FIG. 7 and FIG. 8, the timestamps T1, T2, and T3 are calculated by considering each "Pd—Nd" pair separately, without considering a maximum delay value selected from among Pd1, Pd2, and Pd3 or Nd1, Nd2, and Nd3. Accordingly, there is no relevance of a maximum delay value Pd or common network value Pn in the present example scenario. Therefore, the generated (though not communicated) timestamps are specific to client devices 1, 2, and 3.

Further, the source device 200 may transmit the audio data packets to the client devices 1, 2, and 3 at different time points T1, T2, T3. The client devices 1, 2, 3 accordingly do not buffer data and rather may play the audio data soon upon receiving the same. In addition, the source device 200 may play the video data at any of the times T1, T2, and T3, such that the video playback by the source device 200 and the audio playback by all of the client devices 1, 2, and 3 are 'actively' synchronized.

Although, FIGS. 13-17 and FIGS. 18-20 represent buffering based synchronization and active synchronization, respectively, the present disclosure may be still expanded to cover scenarios where the both types of synchronization are utilized in a single network in accordance with the types and capabilities of devices connected to the network. In such a scenario, while advanced devices may be synchronized based on buffering ability, lesser devices may be synchronized through active synchronization.

Further, though the FIGS. 13-17 illustrate calculation of a common timestamp T1 and affixing the same to all data packets to be sent to the receiving devices, the explanation provided by these figures may also be extended to calculation of timestamps (T1, T2, T3) specific to each receiving device (i.e., client devices 1, 2 and 3 or the monitors 1, 2) and affixing the same to data packets to be respectively sent to client devices 1, 2 and 3 or the monitors 1, 2. As aforesaid, such device specific timestamps may be based on device specific pairs of values such as Pd1-Nd1, Pd2-Nd2, and Pd3-Nd3.

Figure 21:
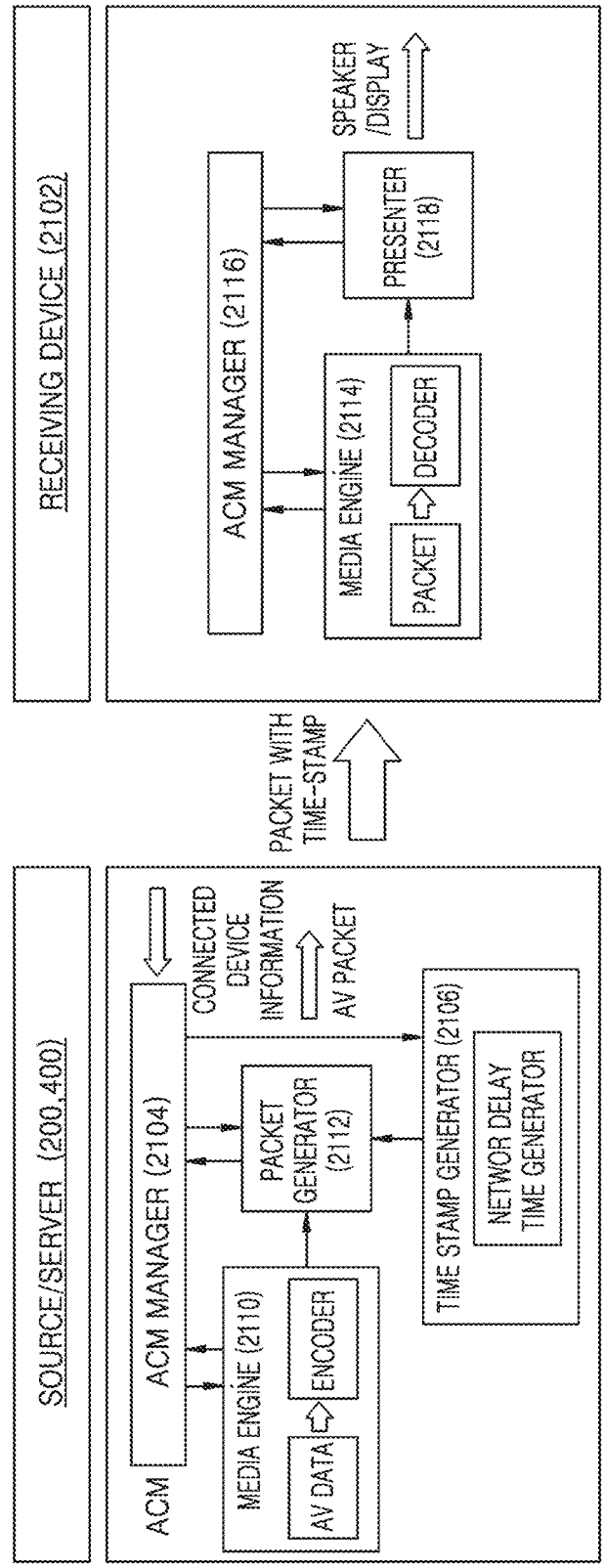
FIG. 21 illustrates an example architecture of the apparatus in accordance with the aforesaid example embodiments of the present disclosure.

FIG. 21 illustrates an example architecture of the apparatus 200, 400 in accordance with the aforesaid example embodiments of the present disclosure. As evident from FIG. 21, the apparatus 200, 400 may be in communication with a receiving device 2102 having its own example architecture.

The apparatus 200, 400 may include an ACM manager 2104 that initializes retrieval of the capability information and data processing ability (as described in FIG. 7) corresponding to every connected device. A timestamp generator 2106 receives data from the ACM manager 2104, calculates Pd, Pn, Pth, and determines the Tserver time period of the source/server device 200, 400, in accordance with FIG. 6, FIG. 7 and FIG. 8. Based upon this calculation, the timestamp generator 2106 calculates the timestamp T1 according to the flowchart illustrated in FIG. 9. In another example, the timestamp generator 2106 may also calculate device specific timestamps T1, T2, T3 as described in reference to FIGS. 18-20.

Further, Pn and Pth may be calculated by a network delay time generator 2108 residing within the time-stamp generator 2106, while Pd may be calculated by any another block included in the Timestamp generator 2106. In another example, Pd may also be calculated by the ACM manager 2104.

Further, the data packet may be generated and encoded by a media engine 2110 and the generated timestamp(s) may be affixed to the encoded data packet by a packet generator 2112. In the event the timestamp is not to be affixed (e.g., under Active synchronization), then the packet generator 2112 may simply time the transmission of the data packet according to the calculated timestamp.

Further, the receiving device 2102 may include its own media engine 2114 that receives the encoded packet, decodes the same and places the decoded packet with the timestamp in a queue for later rendering by a presenter 2118 (i.e., rendering module). In other words, the decoded data packet is stored in a playback buffer of the device 2102 for later rendering. Accordingly, the presenter 2118 renders the buffered data packet according to the timestamp associated thereto.

An ACM manager 2116 within the receiving device 2102 may coordinate with the ACM manager 2104 of the source device 200 or server 400 to provide the capability information and data processing ability concerning the receiving device 2102. Accordingly, the ACM manager 2116 may keeps itself updated with the status of the media engine 2114 and the presenter 2118.

However, in the event the receiving device 2102 does not support buffering or does not understand time-stamps, then the data packet as received by the media engine 2114 may not include a time-stamp, as already explained with respect to FIGS. 18-20. Accordingly in such a scenario, the presenter 2118 may render the data packet immediately after the data packet has been decoded by the media engine 2114. This is because, in such a scenario, the data packets as received by the media engine 2114 have been already timed by the source device 200 or server 400.

Figure 22:
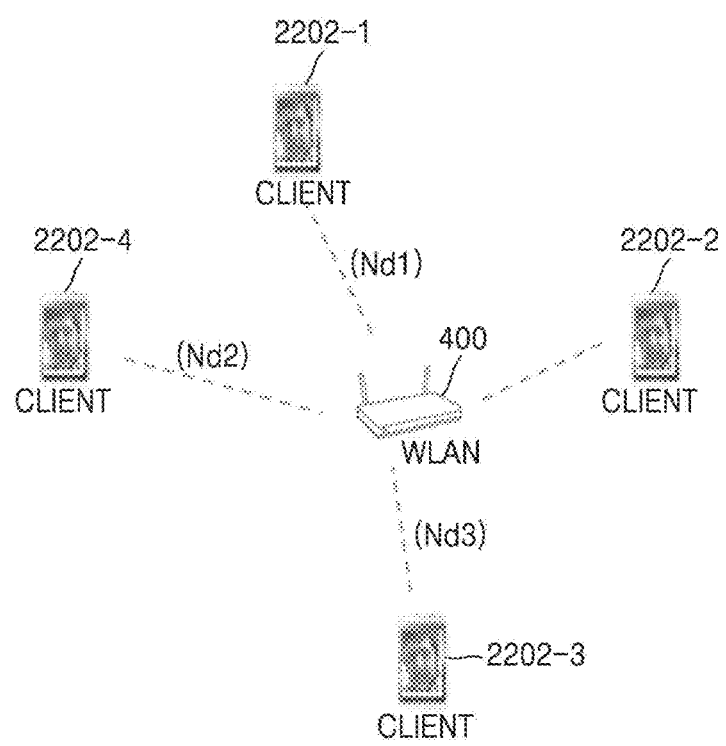
FIGS. 22, 23, and 24 illustrate example applications of the present disclosure.

FIG. 22 illustrates an example application of the present disclosure describing a local network-run gaming application. In this case, two or more multimedia devices 2202-1 through 2202-4 (e.g., mobile device, tablet, etc.) may be connected to a main server 400. A user may configure devices 2202-1 through 2202-4 in a group mode to render video. The source device 200 or server 400 may receive information about the processing capability and corresponding network delay of each of the connected devices. Thereafter, based on mode of operation, the source device 200 or server 400 may calculate a rendering time with respect to the audio and video playback at each of the mobile devices 2202-1 through 2202-4. Accordingly, the mobile devices 2202-1 through 2202-4 may receive encoded frames including the time-stamp information.

Figure 23:
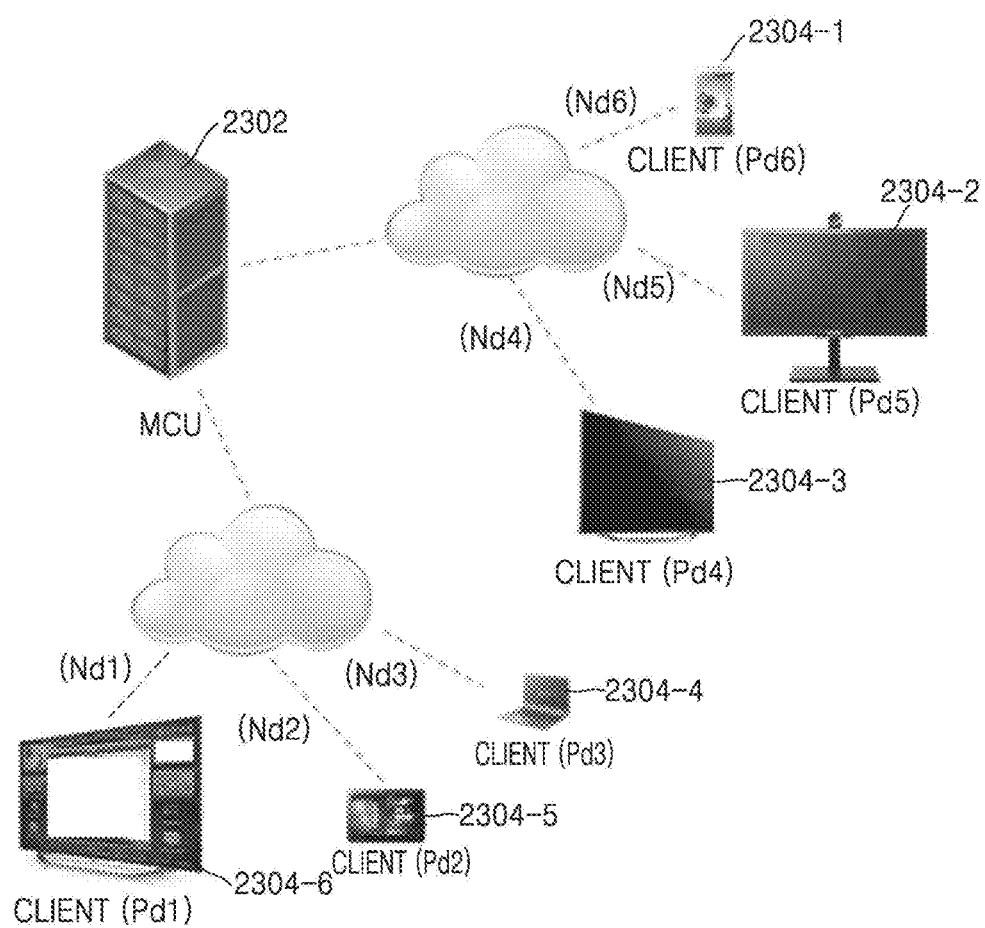

FIG. 23 illustrates another example application of the present disclosure. More specifically, the present example denotes a multi conferencing unit 2302 (acting as a server 400) used in the case of multi-party video conferencing. Multiple users may join a video conference with different devices 2304-1 through 2304-6 having different capabilities. Further, the unit 2302 in the present case may also operate in different modes of operation, i.e. lowest device capability mode and individual capability mode, as discussed with respect to the description of FIG. 6.

Under the Lowest device capability mode, two or more participants may join the video conference call via the multi conferencing unit 2302. The unit 2302 may acquire information about the device capability and network delay of each participant's connected device. The unit 2302 may then calculates display/rendering time information of audio and video data. All client devices 2302-1 through 2302-4 may receive encoded frame with render/play time information. Accordingly, all client devices 2302-1, through 2302-4 in the conference may receive video data according to the lowest device capability (e.g., max frames per second).

Under an individual capability mode, all client devices 2302-1 through 2302-4 in the conference may receive video data according to individual device capability (e.g., max frames per second).

Remaining functions of the unit 2302 in terms of performing synchronization may correspond to the functionality of the source device 200 or server 400 discussed so far.

Figure 24:
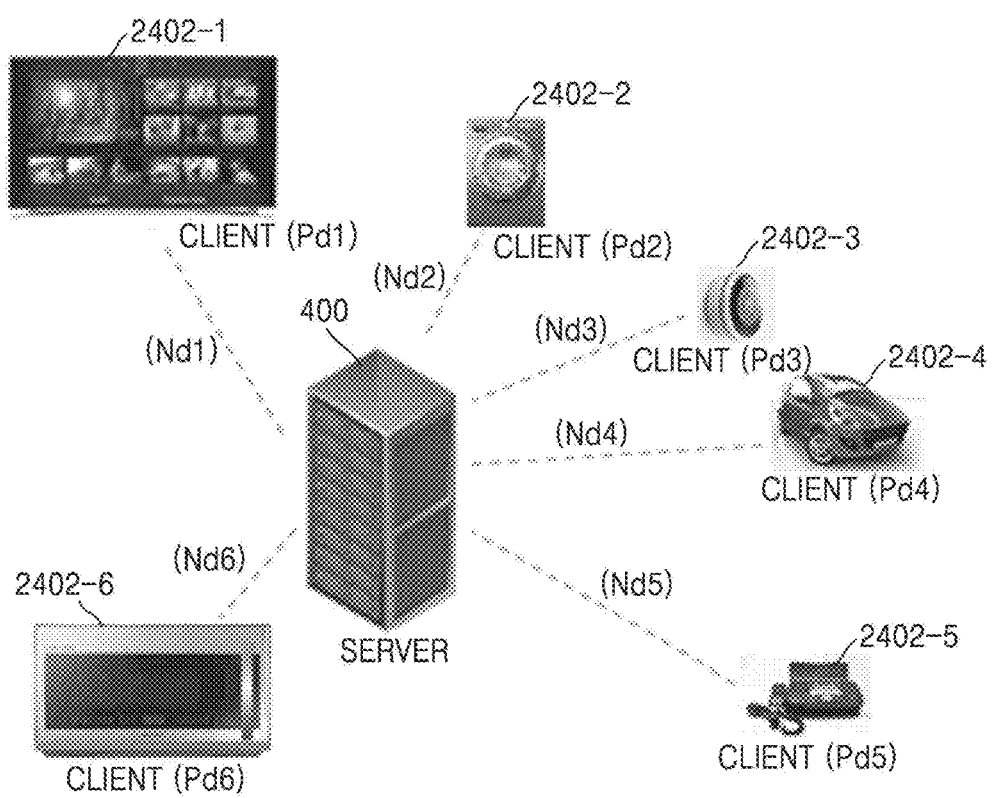

FIG. 24 illustrates another example application of the present disclosure. In the present example, synchronization is achieved among devices connected to a network such as an 'Internet of things' (IoT) based network. The IoT devices 2402-1 through 2402-6 may include an audio device, a video device, an audio-visual device, a communication device (e.g. a telephone), and an electro-mechanical device (e.g. car, air conditioner, washing machine), each example device having an embedded system (e.g. a microcontroller or microprocessor based system).

The IoT devices 2402-1 through 2402-6 are equipped with processing and network capabilities. These devices may generally work without any human intervention and accordingly require time synchronization. Accordingly, information sent from a server 400 to IoT devices 2402-1 through 2402-6 may include a timestamp. In this case, when all of the IoT devices 2402-1 through 2402-6 are required to perform task simultaneously or in a sequence, the source device 200 or server 400 may generate a timestamp based on the network delay and device processing capabilities of the IoT devices 2402-1 through 2402-6. These devices 2402-1 through 2402-6 receive information along with the timestamp, synchronize their clocks with the source device 200 or server 400, and use the timestamp to function together or in a sequence.

In view of the aforesaid description, the present disclosure leads to audio-video synchronization, audio-audio synchronization, or a synchronized operation of interconnected devices, in an unobtrusive way. The present disclosure enables such synchronization or synchronized operations without having to deploy any synchronization mechanism at the receiver end and rather executing it centrally either through a source device or a server device. Due to such a centralized solution, a huge expenditure otherwise associated with deployment of a full-fledged synchronization mechanism at each of the plurality of receiving devices is avoidable.

The present disclosure achieves the aforesaid by intelligently identifying the receiving device's capability such as processing capacity, hardware/software time-stamping, network delay, etc, and accordingly identifying an appropriate centralized synchronization mechanism for all of the networked devices. Moreover, the present disclosure maintains its synchronization effect even if any receiving device in the network assumes a role of the source device for transmitting content to the rest of the devices.

Considering some illustrations, the present disclosure synchronizes audio devices in the case of a multi-speaker system and enables an audio-video synchronization in generally available home theater system comprising of a TV, Mobile, Home theater system, Blue ray Disc-player, Blue ray Disc-Personal video recorder, Room Speaker, and Surround Air Track. Moreover, the synchronization as exhibited by the present disclosure may be used in respect of cloud monitors to synchronize screen in extended mode.

In another example, the present disclosure also enables a synchronized operation of various chip enabled electronic or electro-mechanical equipments (e.g. air conditioners, coffee machines, imaging devices, printer devices, parked automobiles, electronic doors, lighting equipment, etc.) in an office, home, etc. Such equipment may be controlled by a master device.

Further, the synchronization mechanism as discussed by the present disclosure may be retrofitted to an existing network.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method of synchronizing at least one device with a source device, the method comprising:
    receiving, by a receiver, delay information describing at least one device which is connected to the source device via a communication link and configured to process at least one type of data;
    detecting a location of the at least one device and structural obstacles between the at least one device and the source device based on a difference of a transmission efficiency between transmitted audio data and video data;
    calculating, by at least one processor, at least one delay value of the at least one device based on the delay information, the location of the at least one device, and the location of the structural obstacles between the at least one device and the source device; and
    transmitting, to the at least one device via the communication link from the source device, data in a synchronized manner based on the at least one calculated delay value.

2. The method as claimed in claim 1,
    wherein the at least one device is connected to the source device over a network, and
    wherein the delay information is based on one or more of:
        capability of the at least one device,
        a network delay of signals transmitted between the at least one device and the source device over the network, or
        a data processing time.

3. The method as claimed in claim 1,
    wherein the at least one device is connected to the source device over a network, and
    wherein the delay information comprises at least one of:
        capability related information of the at least one device;
        network propagation related information of signals transmitted between the at least one device and the source device over the network;
        data processing related information; or
        a network threshold.

4. The method as claimed in claim 3, wherein the calculating of the at least one delay value of the at least one device comprises calculating the at least one delay value based at least on the capability related information of the at least one device.

5. The method as claimed in claim 4, wherein the calculating of the at least one delay value of the at least one device further comprises statically or dynamically calculating the at least one delay value based on the capability related information.

6. The method as claimed in claim 5, wherein the capability related information of the at least one device is based on at least one of:
    capability information specific to a configuration of the at least one device, when the source device operates according to an operation mode which is dependent on the configuration of the at least one device; or
    capability information corresponding to a configuration which is technically inferior compared to the configuration of the at least one device, when the source device operates according to an operation mode which is independent from the configuration of the at least one device.

7. The method as claimed in claim 3, wherein the calculating of the at least one delay value of the at least one device comprises calculating a network delay based on the network propagation related information, the network delay comprising an amount of time for transmission of data and an amount of time prior to receiving an acknowledgment indicating receipt of the transmitted data.

8. The method as claimed in claim 7, wherein the calculating of the network delay comprises statically or dynamically calculating the network delay based on the network propagation related information.

9. The method as claimed in claim 7, further comprising:
    adjusting the network delay, prior to calculating the at least one delay value.

10. The method as claimed in claim 9, further comprising:
    calculating a threshold parameter for the network delay based on the delay information.

11. The method as claimed in claim 10, wherein the calculating of the threshold parameter further comprises calculating the threshold parameter based on variation of the network delay over an elapsed time period.

12. The method as claimed in claim 3, wherein the calculating of the at least one delay value comprises calculating a data processing time based on the data processing related information.

13. The method as claimed in claim 12, wherein the calculating of the data processing time comprises statically or dynamically calculating the data processing time based on the data processing related information.

14. The method as claimed in claim 13, wherein the data processing time is dependent on a decoding method applicable to the at least one type of data.

15. The method as claimed in claim 1, wherein the at least one device is configured to process at least one type of data which is selected from one or more of:
   audio data;
   video data; or
   display data.

16. The method as claimed in claim 1, wherein the transmitting, to the at least one device via the communication link, data in the synchronized manner further comprises at least one of:
   transmitting at least one type of data in accordance with the at least one calculated delay value;
   communicating a timing value specific to the at least one device; or
   communicating a timing value non-specific to the at least one device.

17. The method as claimed in claim 16,
   wherein the timing value specific to the at least one device is generated based on the delay information, and
   wherein the timing value non-specific to the at least one device is generated based on the network delay.

18. An apparatus for synchronizing at least one device with a source device, the apparatus comprising:
   a receiver configured to receive data from the source device; and
   at least one processor configured to:
      receive delay information describing the at least one device which is connected to the source device via a communication link,
      detect a location of the at least one device and structural obstacles between the at least one device and the source device based on a difference of a transmission efficiency between transmitted audio data and video data,
      calculate at least one delay value of the at least one device based on the delay information, the location of the at least one device, and the location of the structural obstacles between the at least one device and the source device, and
      transmit, to the at least one device via the communication link from the source device, data in a synchronized manner based on the at least one calculated delay value.

19. An apparatus for synchronizing at least one device with a source device, the apparatus comprising:
   a first receiver configured to receive at least one type of data to be transmitted to the at least one device which is connected to the source device via a communication link;
   a second receiver configured to receive delay information describing the at least one device; and
   at least one processor configured to:
      based on a difference of a transmission efficiency between transmitted audio data and video data, calculate at least one delay value of the at least one device based on the delay information, a location of the at least one device, and a location of structural obstacles between the at least one device and the source device, and
      transmit, to the at least one device via the communication link from the source device, data in a synchronized manner based on the at least one calculated delay value.

20. The method of claim 1,
   wherein the detecting of the location of the at least one device comprises detecting a number of obstacles between the at least one device and the source device, and
   wherein the calculating of the at least one delay value comprises calculating the at least one delay value based on the number of obstacles between the at least one device and the source device.

* * * * *